United States Patent [19]
Lust et al.

[11] Patent Number: 5,980,184
[45] Date of Patent: Nov. 9, 1999

[54] APPARATUS FOR REMOVING AND TRANSPORTING ARTICLES FROM MOLDS

[75] Inventors: Victor Lust, Orange Park; Stephen Robert Beaton, Neptune Beach; Scott Frederick Ansell, Jacksonville; Henri Armand Dagobert, Jacksonville; Phillip King Parnell, Sr., Jacksonville; Craig William Walker, Jacksonville; Daniel Tsu-Fang Wang, Jacksonville, all of Fla.

[73] Assignee: Johnson & Johnson Vision Products, Inc., Jacksonville, Fla.

[21] Appl. No.: 09/048,859

[22] Filed: Mar. 26, 1998

Related U.S. Application Data

[63] Continuation of application No. 08/431,884, May 1, 1995, abandoned, which is a continuation-in-part of application No. 08/258,267, Jun. 10, 1994, abandoned.

[51] Int. Cl.[6] .................................................. B65G 47/74
[52] U.S. Cl. ......................... 414/226.01; 414/752; 901/8
[58] Field of Search .................................... 414/225, 749, 414/752, 793, 797, 226.01; 901/7, 8, 40

[56] References Cited

U.S. PATENT DOCUMENTS

| | | | |
|---|---|---|---|
| 3,973,795 | 8/1976 | Goransson | 294/87.1 X |
| 4,576,560 | 3/1986 | Herman | 414/225 |
| 4,773,523 | 9/1988 | Hansen, Jr. et al. | 901/7 X |

*Primary Examiner*—Donald W. Underwood

[57] ABSTRACT

This invention relates to a device for removing and transporting articles, such as ophthalmic lens mold sections, or packaging elements from a mold. The invention, in one embodiment includes first, second, and third assemblies; the first of which removes the articles from the molding station at a first location and transports them to a second location; the second assembly receives the articles from the first assembly and transports them to a third location, and the third assembly receives the articles from the second assembly and transports them to a fourth location. A second embodiment includes a flipper assembly disposed between the first and second assemblies, which flipper receives the articles from the first assembly and inverts them before depositing them onto the second assembly. This second embodiment is useful in conjunction with molded articles which are transported to the flipper assembly in an inverted position. A third embodiment includes second and third assemblies which further include means for altering the relative spacing of the articles while the articles are transported.

5 Claims, 17 Drawing Sheets

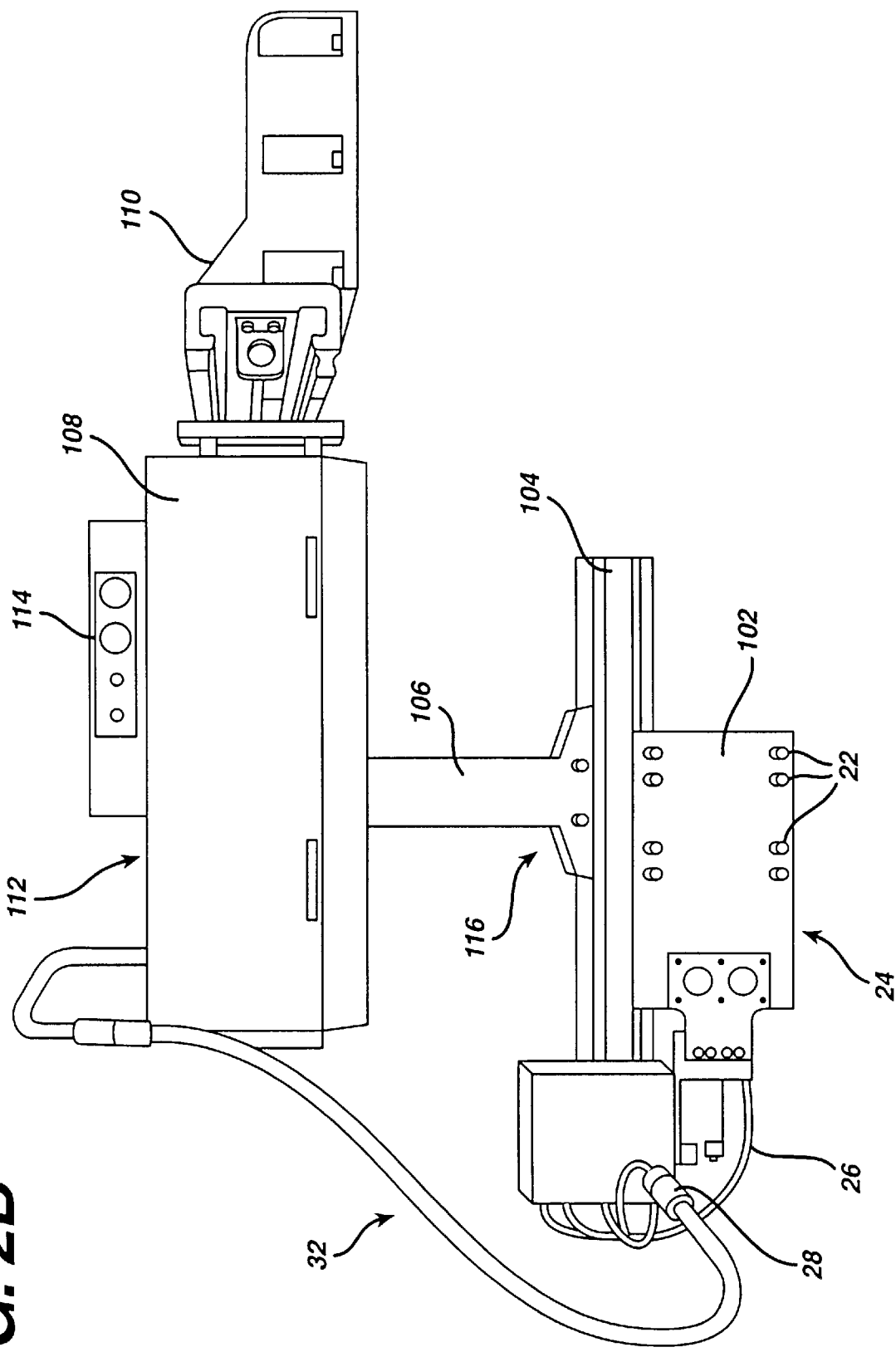

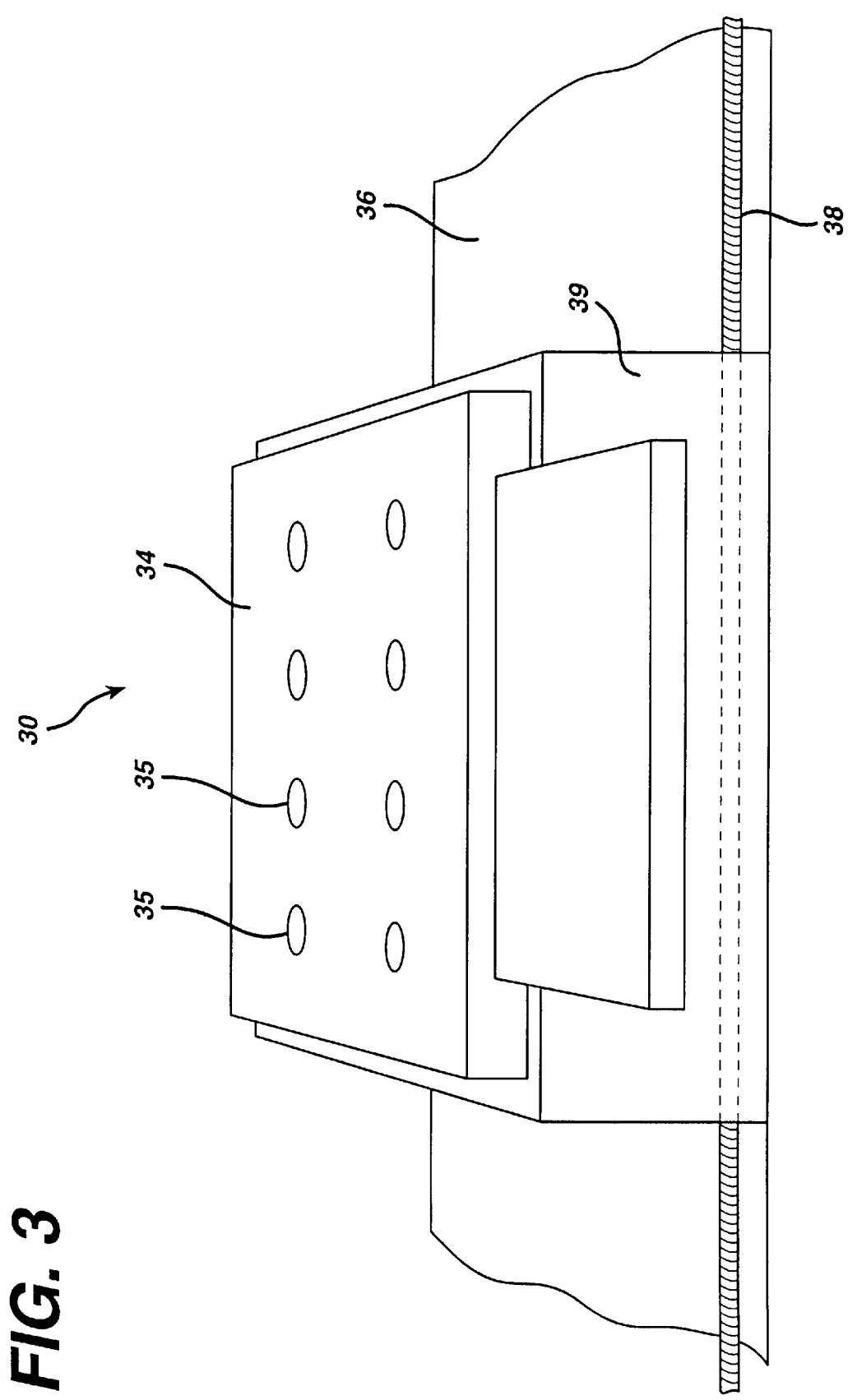

FIG. 4

| | FIRST ASSEMBLY | SECOND ASSEMBLY | THIRD ASSEMBLY |
|---|---|---|---|
| 1 | TRANSLATE FORWARD | TRANSLATE RIGHT | LOWER PLATFORM |
| 2 | ROTATE HAND VERTICAL | STOP | STOP |
| 3 | STOP | TRANSFER ARTICLES | RECEIVE ARTICLES |
| 4 | WAIT | STOP | RAISE PLATFORM |
| 5 | CONTINUE INTO MOLD | TRANSLATE LEFT | ROTATE |
| 6 | GRASP ARTICLES (VACUUM) | TRANSLATE LEFT | TRANSLATE BACK |
| 7 | TRANSLATE BACK | TRANSLATE LEFT | TRANSLATE BACK |
| 8 | ROTATE HAND HORIZONTAL | STOP | TRANSLATE BACK |
| 9 | STOP | RAISE UP PLATFORM | LOWER PLATFORM |
| 10 | RELEASE VACUUM | STOP | DEPOSIT ARTICLES |
| 11 | EJECT ARTICLES | RECEIVE ARTICLES | RAISE PLATFORM |
| 12 | WAIT | LOWER PLATFORM | ROTATE PLATFORM |
| 13 | WAIT | TRANSLATE RIGHT | TRANSLATE FORWARD |
| 14 | TRANSLATE FORWARD | TRANSLATE RIGHT | TRANSLATE FORWARD |

INCREASING TIME (IN STEPS) →

FIG. 8

| | FIRST ASSEMBLY | FLIPPER ASSEMBLY | SECOND ASSEMBLY | THIRD ASSEMBLY |
|---|---|---|---|---|
| 1 | TRANSLATE FORWARD | ROTATES OVER | WAIT | TRANSLATE FORWARD |
| 2 | ROTATE HAND VERTICAL | WAIT | PLATFORM RISES | ROTATES |
| 3 | STOP | RELEASE ARTICLES | RECEIVES ARTICLES | TRANSLATE FORWARD |
| 4 | WAIT | WAIT | PLATFORM DROPS | STOP |
| 5 | WAIT | ROTATE BACK | TRANSLATE RIGHT | PLATFORM DROPS |
| 6 | TRANSLATE INTO MOLD | STOP | PLATFORM RISES | STOP |
| 7 | RECEIVE ARTICLES | WAIT | RELEASES ARTICLES | RECEIVE ARTICLES |
| 8 | TRANSLATE BACK | WAIT | WAIT | PLATFORM RISES |
| 9 | ROTATE HORIZONTAL | WAIT | PLATFORM DROPS | ROTATES |
| 10 | STOP | WAIT | TRANSLATE LEFT | TRANSLATE BACK |
| 11 | WAIT | PLATFORM RISES | WAIT | PLATFORM DROPS |
| 12 | RELEASE ARTICLES | RECEIVE ARTICLES | WAIT | RELEASE ARTICLES |
| 13 | WAIT | PLATFORM DROPS | WAIT | PLATFORM RISES |

INCREASING TIME (IN STEPS) →

FIG. 12

| | FIRST ASSEMBLY | SECOND ASSEMBLY | THIRD ASSEMBLY |
|---|---|---|---|
| 1 | TRANSLATE FORWARD | COMPACTIFY | VACUUM HEAD DROPS |
| 2 | ROTATE HAND VERTICAL | TRANSLATE RIGHT | STOP |
| 3 | TRANSLATE FORMED | RELEASE ARTICLES(FIRST) | GRASP ARTICLES(FIRST) |
| 4 | STOP | STOP | VACUUM HEAD RISES |
| 5 | WAIT | TRANSLATE RIGHT | TRANSLATE BACK |
| 6 | WAIT | STOP | VACUUM HEAD DROPS |
| 7 | WAIT | RELEASE ARTICLES(SECOND) | GRASP ARTICLES(SECOND) |
| 8 | TRANSLATE INTO MOLD | STOP | VACUUM HEAD RISES |
| 9 | GRASP ARTICLES | TRANSLATE LEFT | DRAW ROWS TOGETHER |
| 10 | TRANSLATE BACK | STOP | TRANSLATE BACK |
| 11 | ROTATE HORIZONTAL | WAIT | VACUUM HEAD DROPS |
| 12 | TRANSLATE BACK | PLATFORM RISES | RELEASE ARTICLES |
| 13 | WAIT | STOP | VACUUM HEAD RISES |
| 14 | RELEASE ARTICLES | RECEIVE ARTICLES | EXPAND ROWS |
| 15 | STOP | PLATFORM DROPS | TRANSLATES FORWARD |

INCREASING TIME (IN STEPS) →

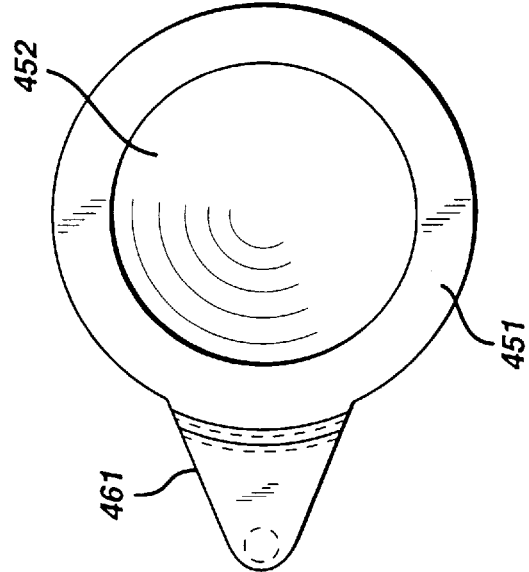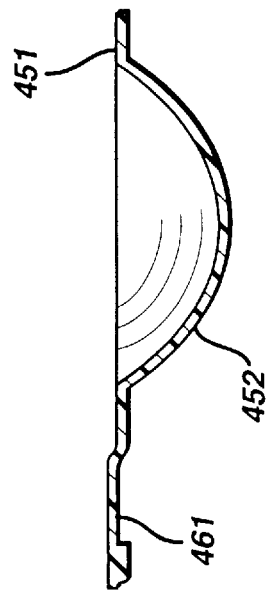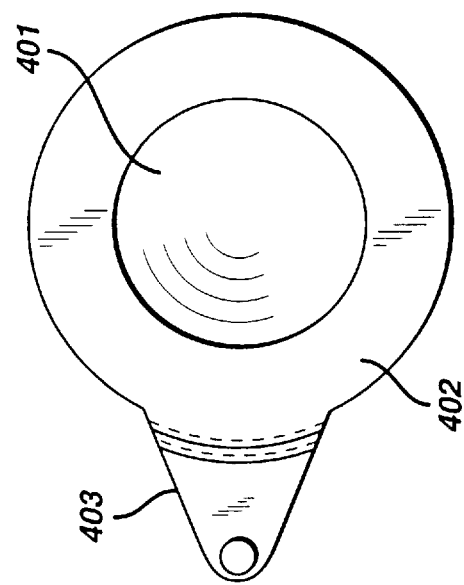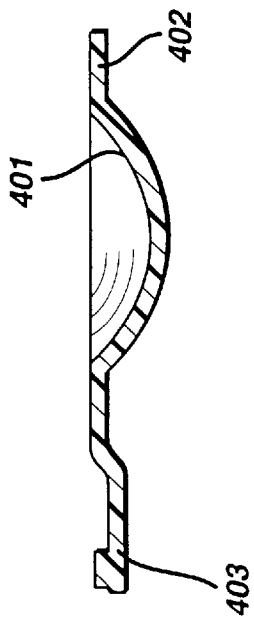

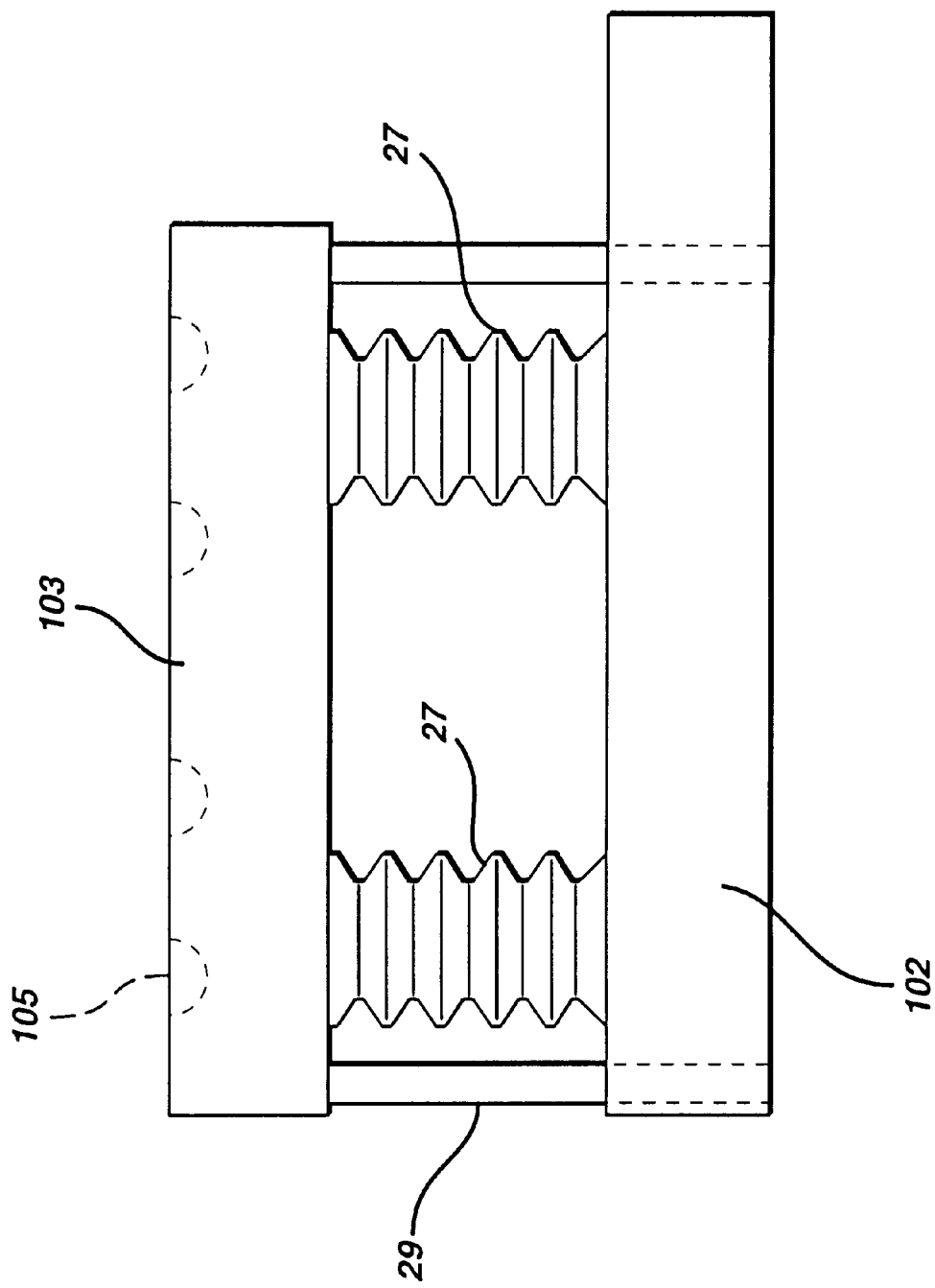

APPARATUS FOR REMOVING AND TRANSPORTING ARTICLES FROM MOLDS

This application is a continuation of U.S. patent application Ser. No. 08/431,884, filed May 1, 1995 now abandoned, which is a continuation-in-part of U.S. patent application Ser. No. 08/258,267, filed Jun. 10, 1994 now abandoned.

BACKGROUND OF THE INVENTION

1. Field of the Invention

This invention generally relates to apparatus for removing and transporting articles from molds. More specifically, the present invention relates to such apparatus that is very well suited for carrying the articles, in a very short period of time, away from the molds and depositing the articles for further processing in a high speed, automated production system.

2. Description of the Prior Art

Recently, attention has been directed toward forming contact lenses in an automated molding system. In such a system, each lens is formed by sandwiching a monomer between front and back mold sections. The monomer is polymerized to form a lens, which is then removed from the mold sections, further treated and then packaged for consumer use.

The mold sections used in the above-outlined process may themselves be formed in injection molding or compression molding processes. These mold sections may be made from the family of thermoplastics, for example polystyrene, which is an excellent material for making these mold sections. Polystyrene does not chemically react with the hydrophilic material used to make the contact lens, therefore, very high quality contact lenses may be formed in polystyrene molds. In addition, polystyrene is widely available and relatively inexpensive. Because of the ease and low cost with which polystyrene mold sections may be made and then used to mold contact lenses, each pair of polystyrene mold sections typically is used to mold only one contact lens and is then disposed of.

In the above-discussed automated contact lens production system, it is desirable to eliminate or to minimize any exposure of the hydrophilic monomer to oxygen. Correspondingly, it is desirable to eliminate or minimize the exposure of the lens mold sections to oxygen. Therefore, when polystyrene mold sections are made and then used in the above-discussed manner, it is desirable to transfer these mold sections quickly from the mold in which they are made, to a low oxygen (preferably nitrogen) environment. It is difficult to achieve the desired transfer speed with conventional robot assemblies or controls because presently available robots do not move fast enough and precise enough to get in and out of the mold with the desired speed. In particular, if these robots are moved with the necessary speed, they tend to waffle and shake undesirably as they come to a sudden stop, and the movements of the robot are not sufficiently precise. If the robots are slowed down to move more precisely, the robots no longer have the desired speed.

Also, in the above-mentioned automated contact lens production system, the contest lens mold sections may not be fully solidified when they are ejected from the mold in which they are made. It is, therefore, important that any robot or apparatus which is used to carry the lens mold sections away from that mold not interfere with the desired optical qualities of the contact lens mold sections. In particular, it is important that any such robot or apparatus absorb the energy of the lens mold sections as they are transferred to that robot or apparatus without altering the shape, form or dimensions of the lens mold sections. That robot or apparatus must, likewise, be able to carry the lens mold sections in a manner that permits those lens mold sections to cool and completely harden in the desired manner.

In addition, in order to maximize the optical quality of the contact lenses, it is preferred that the optical surfaces of the polystyrene mold sections—that is, the surfaces of those mold sections that touch or lie against the hydrophilic monomer as the lens preform is being molded—not be engaged or touched by any mechanical handling equipment, as the mold sections are transported and positioned in the lens molding system.

SUMMARY OF THE INVENTION

An object of this invention is to provide an improved apparatus for removing articles from molds.

Another object of this invention is to remove articles, which may not be completely hardened, from a mold and to carry those articles away from that mold without causing undue plastic deformations of the articles.

Another object of the present invention is to provide a high speed apparatus for removing fragile articles from a mold in which those articles are made, and then transporting those articles to and depositing those articles in a high speed, automated manufacturing system.

A further object of this invention is to transport articles made from the family of thermoplastics, such as polystyrene, from a mold in which those articles are made, and into a low oxygen environment of an automated contact lens molding system, in less than 12 seconds.

Another object of the present invention is to remove a plurality of discrete molded articles from a mold with the molded articles arranged in a matrix array, and to selectively either preserve that matrix array during subsequent handling of the molded articles, or reorient the matrix and the relative spacing of the articles therein according to a second predetermined matrix.

These and other objectives are attained with an apparatus for removing and transporting articles from a mold, which apparatus generally comprises first, second, and third robots or material handling assemblies. The first assembly removes the articles from the mold at the first location and transports the articles to a second location, the second assembly receives the articles from the first assembly at that second location and transports the articles to a third location, and the third assembly receives the articles from the second assembly and transports the articles to a fourth location. These locations may be selected from an infinite set of specific locations; and these first, second, third, and fourth locations may change from time to time and from application to application.

An alternate embodiment of the present invention further comprises a first intermediate assembly, disposed between the first and second assemblies, in which embodiment the articles are transported from the first assembly to the first intermediate assembly, and said intermediate assembly transports the articles to the second assembly.

Still another embodiment of the present invention further comprises a second assembly which changes the relative position of the articles disposed therein while transporting same from the second location to the third location, such as moving the articles closer together along one axis and into a denser packed array. This embodiment further comprises a third assembly which alters the order of the matrix of articles.

In each embodiment it is preferable that the first material handling assembly include a receiving means for retrieving and transporting articles from the mold to the second location. In several embodiments it is preferable that the receiving means be a hand having fingers to receive the articles from the mold and to hold the articles. In other embodiments the first assembly comprises a vacuum plate having recesses therein for receiving and securably holding the articles during translation. With respect to all of the embodiments, the receiving means is mounted to a support subassembly which, during operation, reciprocates along an axis, whereby its distal end moves into and out of a proximal position with respect to the locus of mold section fabrication. The receiving means is mounted on the support subassembly in a manner which permits sliding motion along the same axis of reciprocation so that it may reciprocate along the support subassembly from one end to the distal end. It is understood that the sliding action of the receiving means, relative to the support subassembly, may be actuated by a motive driver of either the receiving means or the support subassembly. The receiving means may, thereby, reciprocate between the locus of mold section fabrication and the second location in accordance with the proper selection of reciprocation rates of the receiving means and the support subassembly.

In addition, the first material handling assembly further comprises a means for rotationally pivoting the receiving means between a substantially vertical orientation and a substantially horizontal orientation. It is understood that either the receiving means or the support subassembly may comprise a rotating actuator which drives the rotation.

In the embodiments in which the receiving means is a hand, the fingers and the hand are preferably compliant, or are otherwise capable of dampening the energy of the articles, so that transportation of the articles from the locus of fabrication to the second location does not cause any undesirable plastic deformation of the articles, even if those articles are not completely solidified when they are received by the hand. In embodiments in which the receiving means is a vacuum plate having recesses, the mounting of the plate to the subassembly is preferably resiliently biased so that it is similarly dissipative of mechanical energy imparted during article transference.

The second material handling assembly preferably includes a generally horizontal platform having receiving ports in its surface which receive the articles when deposited by the first assembly. The second assembly translates horizontally from the second location to the third. In certain embodiments it is additional desired that the platform be mounted on a support frame having means for move the platform vertically as well as horizontally at the second location and/or the third. During operation, the first assembly transports the articles from the locus of fabrication to the second location and deposits the articles into the receiving ports in the surface of the platform. In those embodiments in which the second assembly moves vertically as well, the assembly moves up to receive the articles, descends after the articles have been received, and translates horizontally to the third location.

At the third location a third assembly retrieves the articles from the second assembly and transports them to the fourth location, which may be, for example, a pallet. In the preferred variation of several embodiments, the third assembly comprises a rotating platform which rotates the articles being transported by 90 degrees within the horizontal plane. This reorientation is necessary for use in manufacturing environments having pallets, or other receiving means, at the fourth location which are oriented orthogonally with respect to the orientation of the matrix of articles being fabricated and transported by the first and second assemblies.

In a variant of this embodiment, a first intermediate assembly is disposed between the first and second assemblies, which intermediate assembly flips the articles with respect to their vertical orientation, so that the articles are properly positioned for later assembly. In such an embodiment the first assembly transports the articles from the first location, which is the mold station, and deposits the articles into recessed ports in the first intermediate assembly. Once the articles have been positioned within the first intermediate assembly, the assembly rotates about an axis in the horizontal plane, therein flipping the articles with respect to their vertical orientation, and deposits them into the ports of the second assembly. In a preferred variation of this embodiment, the first intermediate assembly is mounted to both a means for rotating it as well as a means for translating the platform vertically so that the ports thereof may be raised in close spaced relation to the receiving means of the first assembly for accurate deposition of the articles in the ports, while also more closely approaching the second assembly during transference of the articles therefrom to the second assembly.

In the preferred variation of the alternative embodiment in which the second and third assemblies reorient the articles transported thereby, the second assembly comprises moving blocks on which the articles are deposited by the first assembly, and which draw together or spread by means of reciprocating elements, thereby altering the relative spacing of the articles. In addition, the transference of the articles from the second assembly to the third assembly is carried out in multiple steps whereby the order of the distribution matrix may be altered.

The reoriented and redistributed matrix of articles is then transported to the fourth location by the third assembly. In this preferred variation the design of the third material handling assembly includes a plurality of receiving plates having fingers for grabbing and releasably holding the articles and a support track to which it is mounted. During operation, the receiving plate descends to the third position where it removes the articles from the second assembly platform ports via the grabbing function of the fingers. The receiving plates and the articles are then raised and transported to the fourth location, during which translation the receiving plates may be drawn together to further tighten the distribution of the articles. Once the third assembly has reached the fourth location, the articles are lowered and deposited, for example into pallets in which the articles may be carried to the lens fabrication stations.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIGS. 2a, 2b, and 2c are side views of variation of the first assembly which may be included in the apparatus shown in FIGS. 1, 5, and 9.

FIG. 3 is a perspective view of the second assembly which is included in the first apparatus shown in FIG. 1.

FIG. 4 is a time-function chart illustrating the integrated cycles of operation of the first apparatus.

FIG. 8 is a time-function chart illustrating the integrated cycles of operation of the second apparatus.

FIG. 12 is a time-function chart illustrating the integrated cycles of operation of the third apparatus.

FIGS. 13a, 13b, 13c, and 13d are edge and top views of the back and front mold sections which may be transported by this invention.

FIG. 15 is a side view showing the coupling of the vacuum plate to the vacuum head of the first assembly of the first apparatus.

DETAILED DESCRIPTION OF THE PREFERRED EMBODIMENTS

Figure 1:
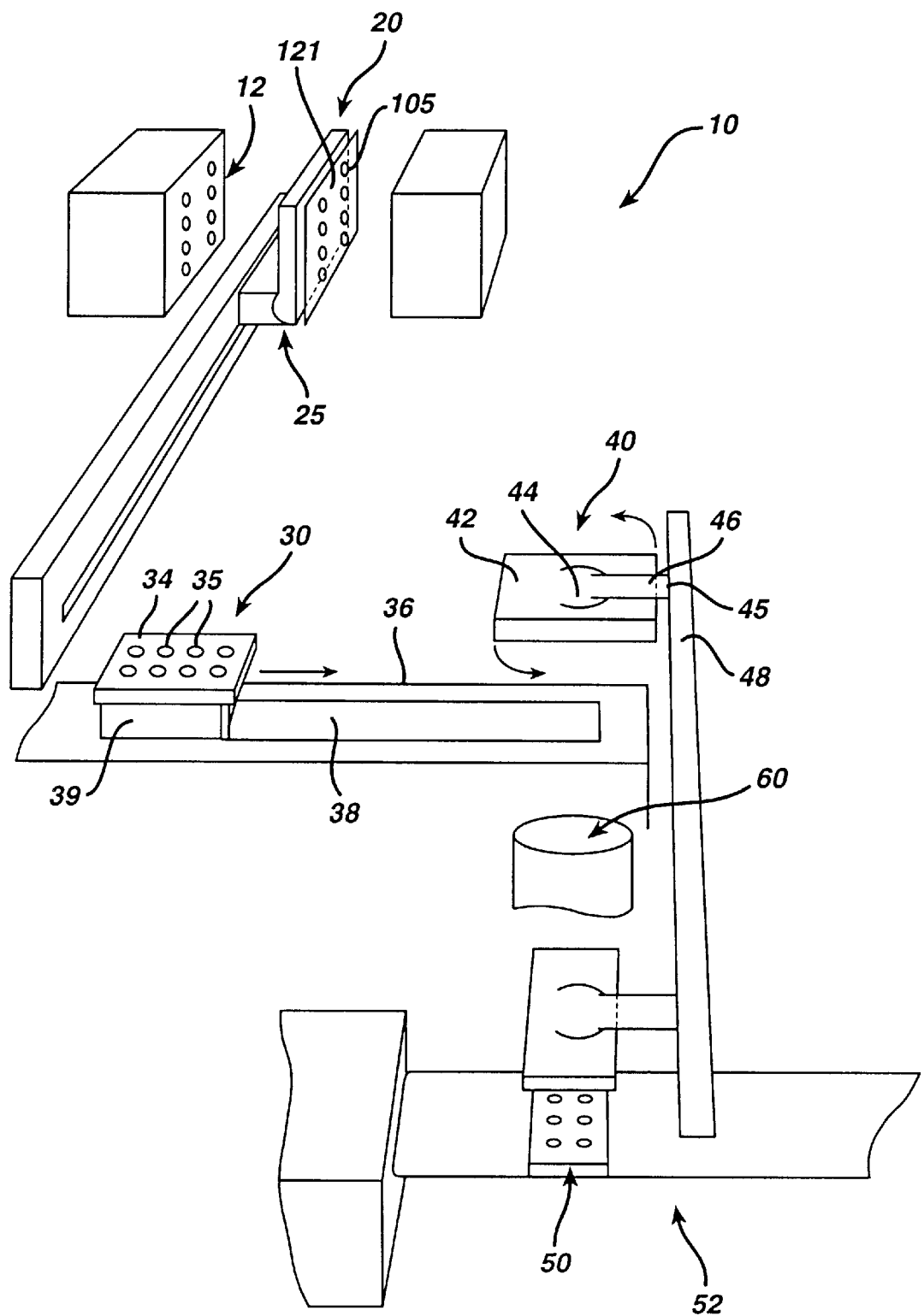
FIG. 1 is a simplified perspective view of the first apparatus according to the present invention.

This invention relates to the removal of molded articles, which are used in the fabrication of contact lenses, at regular intervals from a molding station at a first location, and subsequent disposition of the articles at a remote location, such as on a pallet of an assembly line. As such, this application herein incorporates by reference the specification and disclosure of U.S. patent application Ser. No. 08/258,654 to Wallace Anthony Martin et al. (attorney Docket No. VTN-0092) for "Consolidated Contact Lens Molding". The present invention is particularly suited for carrying out the above identified function in an improved manner than prior devices and assemblies. The following descriptions, with references to the corresponding Figures, set forth the salient features and elements of three distinct embodiments of the present invention; the first being directed to the removal and transportation of back curve mold halves; the second being directed to the removal and transportation of front curve mold halves; and the third being directed to the removal and transportation of molded packaging elements.

BACK CURVE TRANSPORT ASSEMBLY

The process of fabricating contact lenses, in a manner for which the present invention would be useful, comprises creating a pair of mold halves, between which a liquid monomer may be disposed, shaped into a lens, and subsequently irradiated to prompt sufficient crosslinking to provide appropriate structural integrity to the lens. The mold half sections which are used in creating the lenses are themselves molded; the molding process being especially intolerant of irregularities to the optical perfection required of the surfaces. The mold sections are created in a rapid injection molding machine which produces a multiplicity of mold sections every six seconds.

The molding machine comprises two opposing elements which interface to shape the mold halves; one element having an array of regularly spaced concave recesses, the opposing element having a corresponding array of convex protuberances. The concave recesses and convex protuberances defining, therebetween, a shaped volume for producing mold half sections. A more detailed description of the molding machine, in conjunction with which the present invention is utilized, may be found in the copending U.S. application Ser. No. 08/257,785 for "Mold Halves and Molding Assembly for Making Contact Lenses" (attorney Docket VTN-079), which is incorporated herein by reference.

In operation, the opposing elements come together, the material of the mold halves, for example molten polymer, is injected into the shaped volumes between the surfaces of the opposing elements, and the mold halves are held for a period of time sufficient to set their shapes.

Once the shape of the mold half has been set, the opposing elements of the molding machine separate and the mold halves may be removed. The back curve mold halves are referred to as such because they provide the convex optical mold surface which shapes the portion of the contact lens which contacts the eye. The front curve mold halves are so called because they provide the concave optical surface which molds the front face of the lens. In accordance with methods set forth to maintain optimal optical surface integrity, the molding machine which produces the back curve mold sections is designed specifically so that upon separation, the non-optically relevant, concave surfaces of the mold halves are exposed (the convex surfaces remaining within the concave recesses). While the machine which produces the front curve mold sections is identical in nearly every functional aspect to the above described back curve machine, when the opposing elements of the front curve molding machine separate, the front curve mold sections remain in contact with the convex protuberances. In either case, it is once the opposing elements of the molding machine have separated that the molded articles may be removed.

FIGS. 13a–d show front and back curve mold sections which are used in the manufacture of contact lenses. FIGS. 13c and 13d are top and side views, respectively, of a back curve mold section; which includes a central lens shaping curved portion 452, an annular flange portion 451, and a tab 461. Because, in the case of the back curve, the central curved portion is used to form or shape the back curve or surface of a contact lens, it is desirable to minimize direct contact therewith; the flange 451 and tab 461 portions are, therefore, used to facilitate handling and positioning the article. The simultaneous molding of the curve surface 452 with the annular flange 451 and tab 461 portions has an additional manufacturing benefit in that it optimizes the injection molding process.

Preferably, the mold sections are each integrally molded from a plastic material from the family of thermoplastics such as polystyrene or another suitable material; and preferably each mold section has a thickness, typically 0.8 mm and 0.6 mm respectively, and rigidity such that the mold section effectively transmits light and withstands prying forces applied to separate the mold sections from the mold in which those section were made. The mold sections are also described in detail in the above-referenced copending application "Mold Halves and Molding Assembly for Making Contact Lenses".

The first apparatus to be described is, accordingly, directed to the removal and rapid and non-damaging transport of the back curve contact lens mold halves from the molding station to a remote location, for example to a pallet on a contact lens fabrication assembly line. More particularly, referring now to FIG. 1, the first apparatus 10 includes first, second, and third material handling assemblies 20, 30, and 40. The first assembly 20 is provided for removing the articles from the mold 12 at a first location and transporting the articles to a second location. A second assembly 30 is positioned for receiving the articles from the first assembly 20 and transporting the articles from the second location to a third location. The third assembly 40 is provided for receiving the articles from the second assembly 30 and for transporting those articles from the third location to a fourth location, which is the remote location, for example a pallet 50 on a contact lens manufacturing line 52.

Figure 2A:
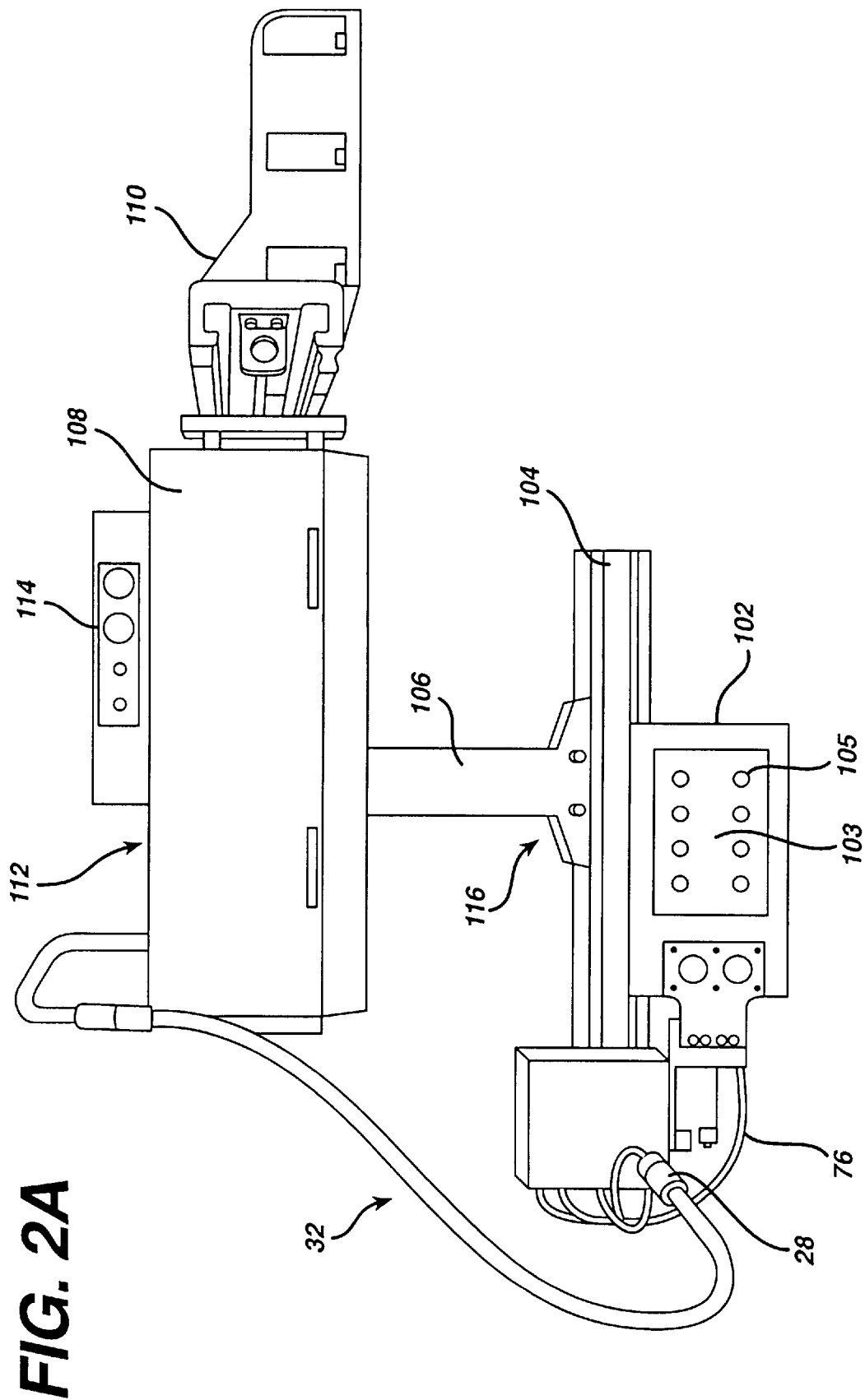
Figure 2C:
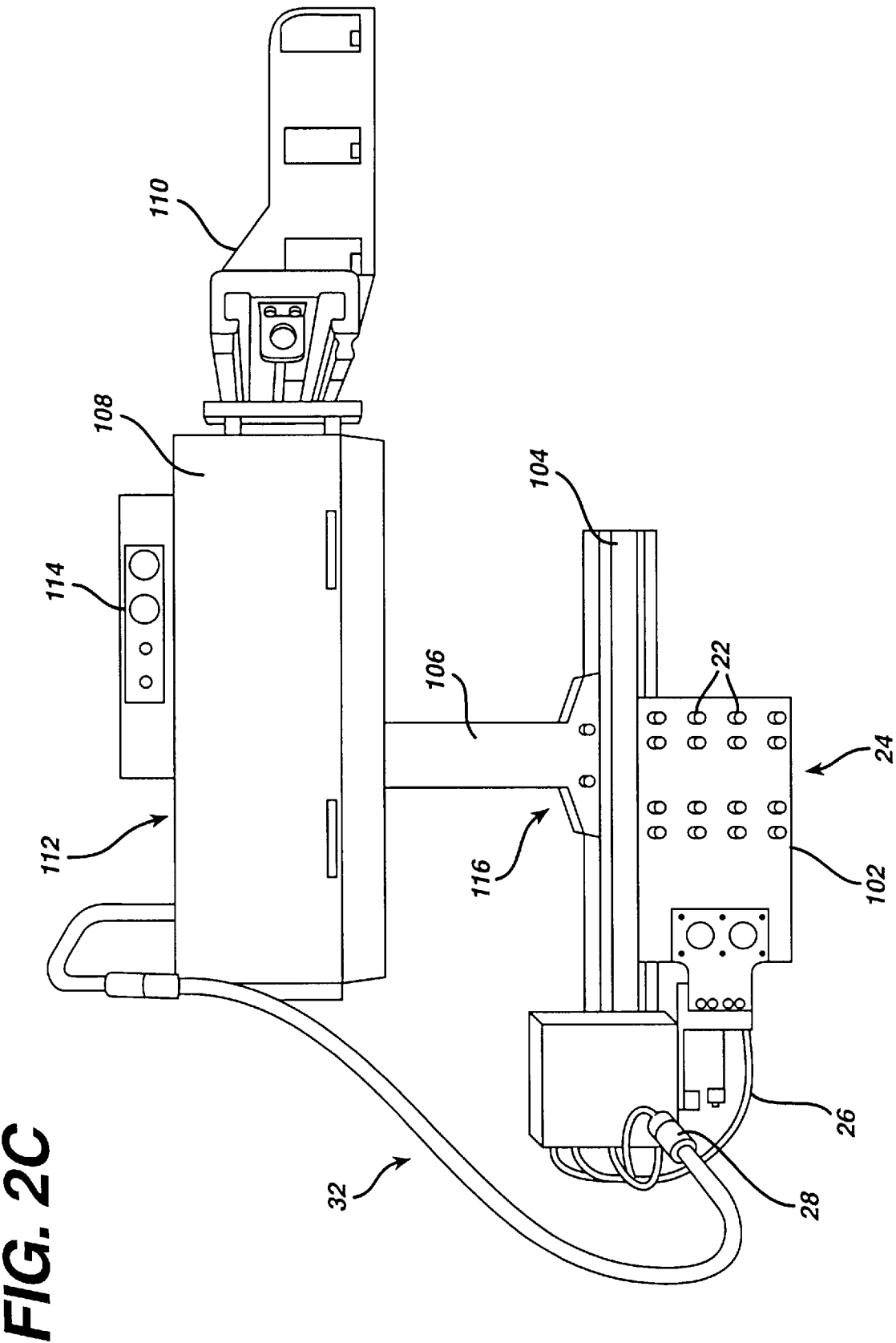

With reference to FIGS. 2a and 15, the first assembly 20 includes a vacuum head structure 102, a horizontally aligned cursol arm 104, a vertically mounted traveling arm 106 and a stationary support subassembly 108. The stationary support subassembly 108 includes a support frame 110, to which it is fixably mounted, and a main body structure 112. Within the main body structure 112 are a vacuum controller unit 114 (the cover of which is shown), and a translating means (not shown) which reciprocates the vertically mounted traveling arm 106 along the horizontal axis. In a preferred embodiment, this translating means comprises a horizontally oriented ballscrew.

At its remote end 116, the vertically mounted traveling arm 106 is fixably coupled to the horizontally aligned cursol arm 104. Reciprocation of the vertical arm 106, necessarily causes the cursol arm 104 to move with a regular forward and backward sliding motion, in accordance with the horizontal translation of the ball screw. A timing belt (not shown) is coupled to the horizontal ball screw in the main body structure 112 and extends down the vertical arm 106 and along the extent of the cursol arm 104. Slidably mounted to the cursol arm 104, and coupled to the timing belt, is the vacuum head 102 which is translated along the length of the cursol arm 104. This arrangement permits the additive motion of the vertical arm 106 and the vacuum hand 102, therein permitting the hand 102 to travel to the first location, which is between the separating opposing elements, without either the head or arm having to attain undesirably high relative velocities, which may lead to vibration. In a preferred embodiment, the timing belt defines a ratio of velocity of the vacuum head 102 to the cursol arm 104 of 2 to 1.

The vacuum head 102 of the preferred embodiment comprises a vacuum plate 103 having recesses 105 into which the articles may be placed. The vacuum plate 103 is mounted to the vacuum head via multiple silicone bellows 27 and a linear slide 29 (also see FIG. 1, elements 121). This mounting permits the plate 103 to reciprocate with respect to the vacuum head 102, in accordance with the drawing of a vacuum in the plate 103.

Once the vacuum head 102 has been translated into the molding station 12, and is at the extreme point of its reciprocation, an actuator and timing mechanism (not shown) activates the vacuum drawing means (also not shown). It is understood that a variety of equivalent means may be utilized for drawing a vacuum within the vacuum plate 103, however, a venturi tube system is particularly well suited for this apparatus 10 as the vacuum drawn in the plate 103 needs to be strong enough to hold the articles, but not so strong as to deform the optical surfaces of the hardening plastic.

The molding station 12 has ejector pins (not shown) which push the curve articles out of the mold element and into the recesses 105 in the vacuum plate 103. The vacuum which is being drawn in the recesses 105 and the plate 103 assists the securing of the articles within the recesses. Once the sealing of the articles to the vacuum plate 103 causes the plate to move toward the vacuum head 102. It is preferable to have a set of resilient silicone bellows which mount the vacuum plate 103 to the vacuum head 102 so that the plate may be biased back to the extended position away from the vacuum head once the vacuum is released.

Figure 14:
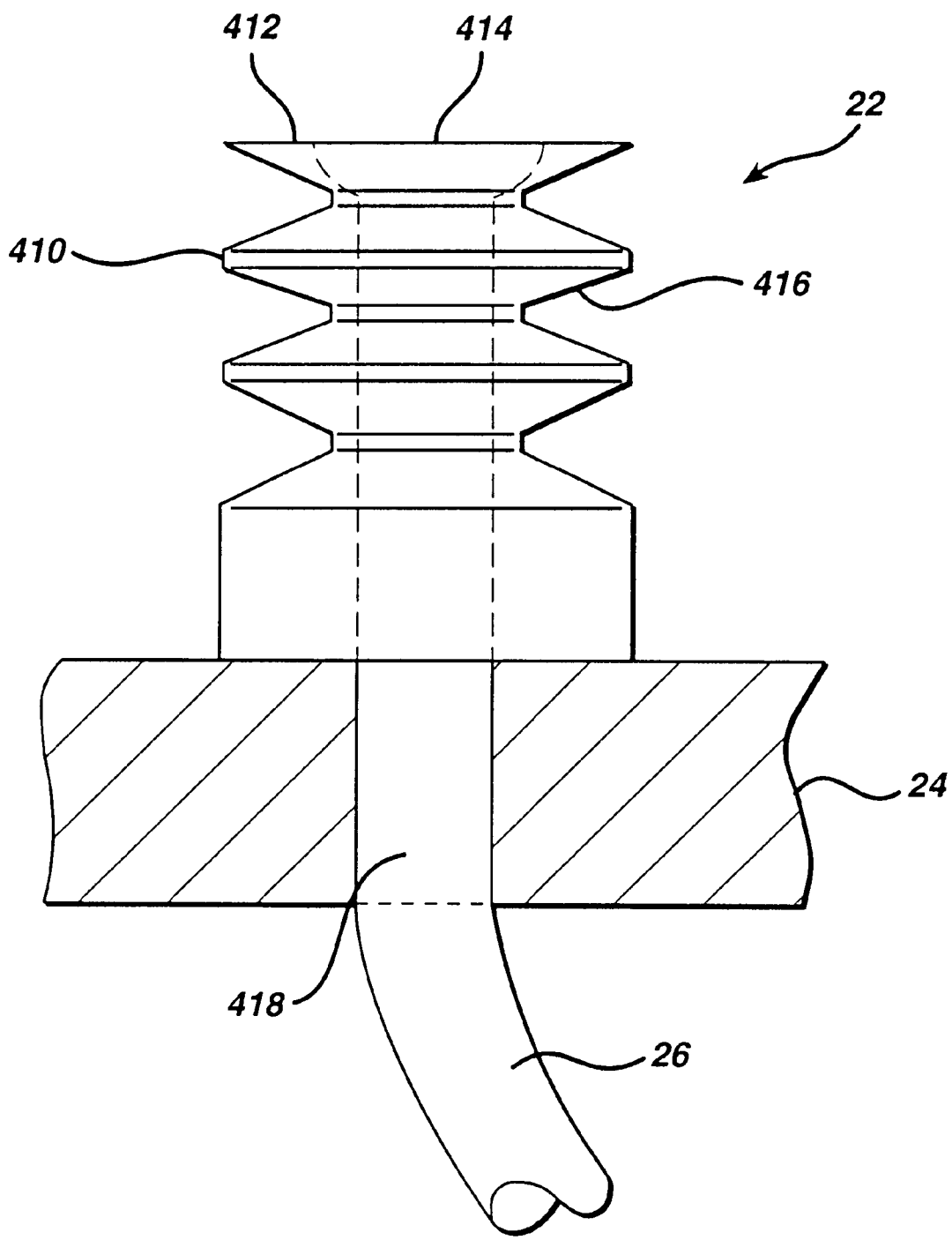
FIG. 14 is a side view of one of the bellowed fingers which is included in one variation of the first assembly of this invention.

The recesses 105 may comprise small recesses formed in a surface of the plate, or small cups mounted on that surface of the plate, or the bellowed fingers further described with respect to the front curve transporting apparatus and FIG. 14. It is also preferable that the receptacles be connected to a vacuum source, so that the resultant low pressure in the recesses may assist in the transference of articles from the molding station to the plate as the ejector pins eject the articles from the mold. The entire transference process is carried out through the steps of: having the head translate forward to a position adjacent to the mold station element; having ejector pins push the molded articles forward towards the recesses of the plate; the vacuum suction securing the articles within the recesses; the sealed vacuum conduits providing the low pressure within the vacuum plate structure so that the plate is retracted away from the mold station element.

Referring again to the specific embodiment shown in FIG. 1, the mounting of the vacuum head 102 to the cursol arm 104, which head is slidably coupled thereto for reciprocation forward and backward, from the first mold half pickup location to the second mold half drop-off location, further comprises a rotating joint 25. This joint 25 is driven, by an air cylinder (not shown) having stops thereon, which permits the head and plate 102,103 to rotate from vertical to horizontal, through a 90 degree rotation, during each linear stroke of the regular reciprocation of the hand. In operation, when the vacuum head 102 begins its linear reciprocation after receiving the mold half articles from the mold 12, it is oriented vertically (in correspondence with the plane of the mold element face). As the head 102 is translated, along with the cursol arm 104, toward the second location, it is rotated into a horizontal position wherein the recesses 105 in the vacuum plate are oriented downward. At the second location the articles are released from the recesses, via release of the vacuum, into a platform of the second assembly 30. Once the articles have been released and the head 102 begins to reciprocate back toward the mold 12, it is rotated back into a vertical orientation for the next pickup.

It is understood that the rotation of the head 102 through the 90 degree rotation be achieved equivalently by a number of different means, for example by providing a translation track along the cursol arm which has a 90 degree twist, the linear reciprocation of the head along the cursol arm, therein also imparting a rotation of 90 degrees to the head 102.

Preferably, this first assembly 20 is a high speed, low mass assembly, and is able to move the head 102 into the mold 12 and remove articles therefrom in less than 0.8 seconds, and more preferably, in less than 0.4 seconds. Also, preferably the head 102 is constructed of a low mass, high stiffness material, for example, polyvinylchloride foam core and carbon fiber unidirectional fabric.

Referring now to FIGS. 1 and 3 the second assembly 30 of this embodiment is shown. The second assembly 30 includes a platform 34, a translating carriage structure 39, and a support frame 36 forming linear tracks 38 along which the translating carriage structure reciprocates from the second location to the third location. It is understood that a variety of suitable means for steady and efficient translation of the assembly may be selected, for example a motor and ball screw, a reciprocating hydraulic arm, or a geared wheel and motor combination. In the preferred embodiment, the translation means is a two ballscrew system, the first of which translates the assembly from the second location to the third, and the second of which raises and lowers the assembly at each location in accordance with the preferred function of the apparatus.

The platform 34 of the second assembly 30 has a regular array of recesses 35 which are suited for the deposition into, and removal therefrom, of mold articles such as are deposited therein by the first assembly 20 at the second location. In operation, the first assembly 20 reciprocates back from the mold 12, having extracted the mold articles therefrom, and rotates from a vertical orientation to a horizontal orientation by the time that it reaches the second location. Simultaneously with the proper orientation and positioning of the first assembly 20 at the second location, the second assembly 30 is in position for receiving the articles. The release of the vacuum within the vacuum plate 103 of the first assembly allows the articles to drop into the recesses 35 of the platform of the second assembly 30. Once the articles have been so positioned, the second assembly 30 translates linearly along the tracks 38 to the third location.

Figure 7:
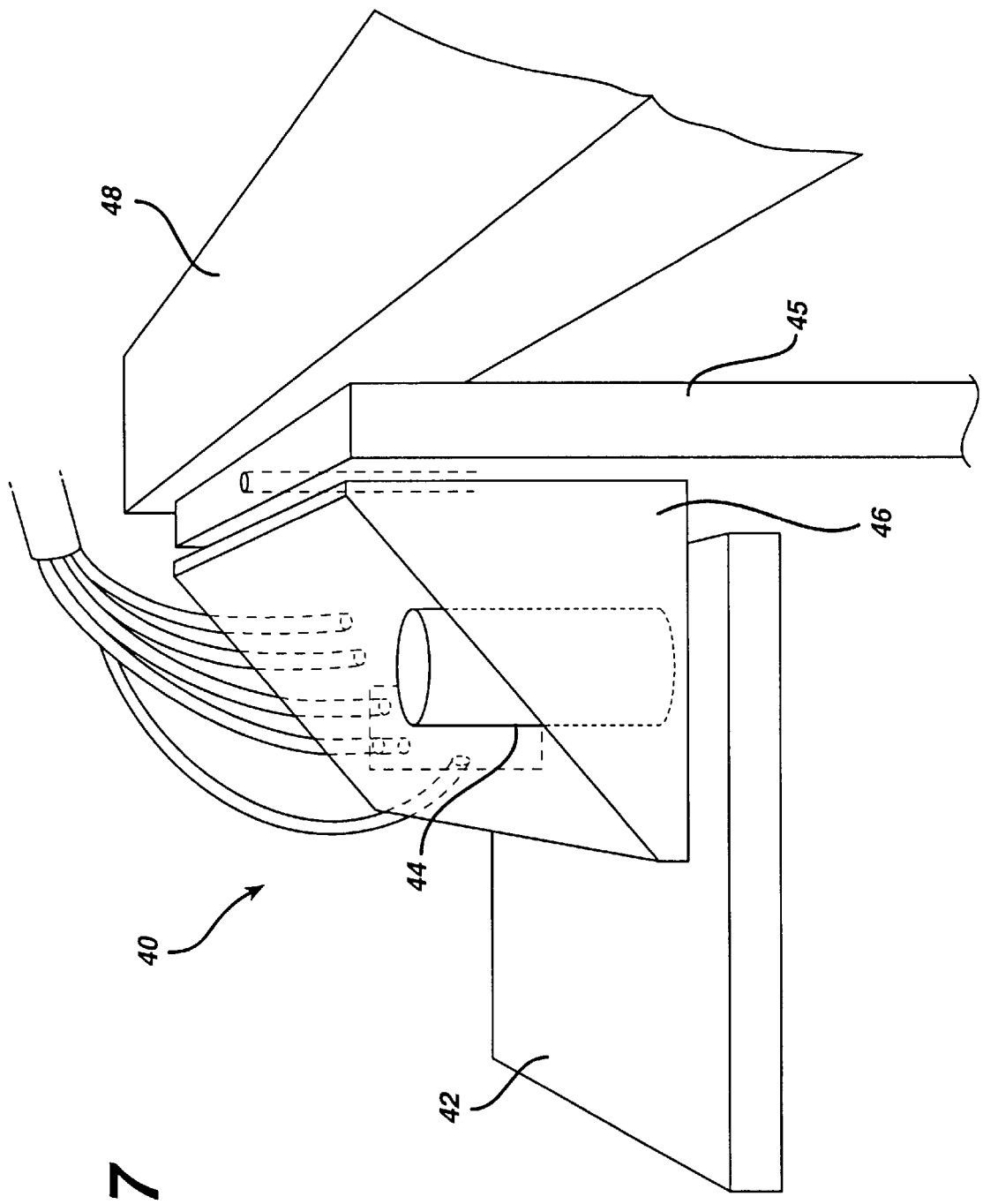
FIG. 7 is a perspective view of the third assembly which is included in both the first and second apparatus.
Figure 9:
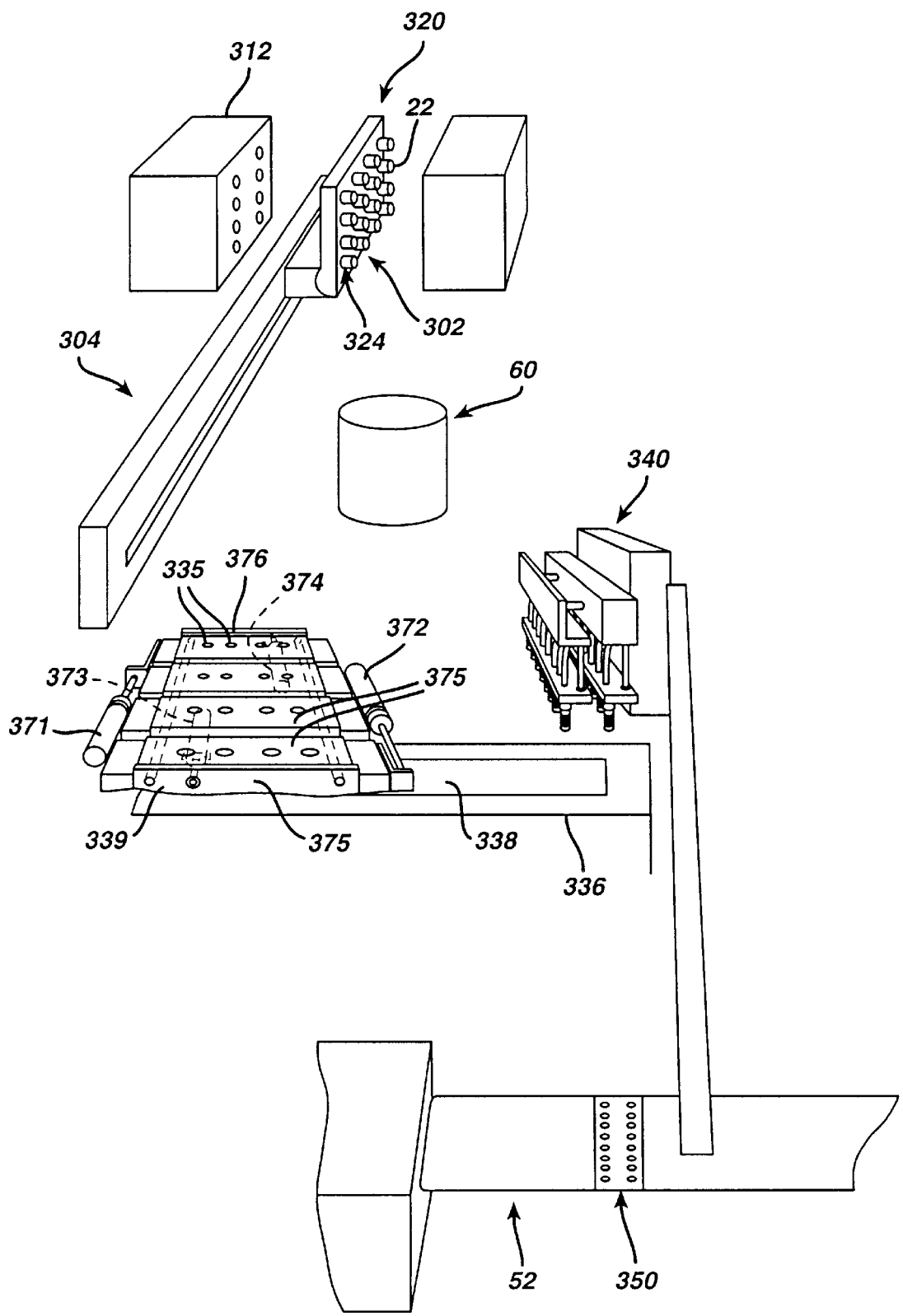
FIG. 9 is a simplified perspective view of the third apparatus according to the present invention.

Referring now to FIGS. 1 and 7, the third assembly 40 includes a receiving head 42, a support body 46, a rotating coupling means 44, and a horizontal reciprocating track 48. The first end 45 of the support body 46 is disposed in the track 48, and coupled to a translation means whereby the body 46 (and the receiving head et al.) may be reciprocated from the third location to the fourth location. The means of translation of the support body, and the receiving head 42, is preferably a horizontal axis ball screw assembly. The support body 46 is coupled to the rotating coupling means 44, which is, in turn, coupled to the receiving head 42. The rotating coupling means 44, which may be, for example an air cylinder with 90 degree rotation stops, is designed to provide a rotation of the receiving head in the horizontal plane.

In addition, the support body 46 comprises a vertical axis ball screw which permits translation of the receiving head 42 up and down. This up and down motion is preferred in the retrieving and depositing functions of the third assembly at the third and fourth locations respectively.

The receiving head 42 is oriented downward to enable it to extract the articles from the platform 34 of the second assembly 30 at the third location, and to subsequently deposit the articles at a fourth location, for example in a pallet 50 on an assembly line 52. The receiving plate 42 comprises an array of bellowed fingers 22, which will be more fully described hereinafter with respect to FIG. 14. A low pressure may be drawn in the fingers for lifting the articles out from the recesses 35 in the platform 34 of the second assembly 30, and for holding and transporting the articles from the third location to the fourth location.

It is understood that individuals ordinarily skilled in the art may substitute other extraction, grasping, and holding means and relationships for the exchange of the articles between the assemblies herein described without removing such an apparatus from the scope of the invention herein disclosed. Another such alternative transference means could include a set of extending pins, disposed in the recesses of the second assembly, which would lift the mold curves out of the recesses at the third location, and insert them into receiving recesses in the third platform such as comprises the first assembly. In such a design, however, particular care must be taken to prevent misalignment of the articles with respect to one another during the transference.

In operation, the receiving plate 42 of the third assembly 40 is first positioned at the third location, oriented so that its fingers (or other receiving means) are properly positioned for extraction of the articles from the platform 34 of the second assembly 30. Once the articles have been extracted by the third assembly 40, the mounting arm is translated along the track 48 via a ball screw mechanism, toward the fourth location, during which translation the rotating air cylinder 44 reorients the plate 42 by 90 degrees in the horizontal plane. At the distal end of the translation, if a receiving structure, such as a pallet 50, is properly positioned with the plate 42 positioned thereabove, the vertical ball screw within the support body 45 lowers the plate 42, and fingers thereof, to the deposition pallet. Once in position, articles are released by the plate and deposited.

If it is determined that no proper receiving structure 50 is present at the fourth location, the third assembly 40 is reciprocated via the rotating ball screw, back toward the third location, stopping briefly at an intermediate location between the third and fourth locations and releases the mold half articles into a bin 60. These released mold halves may then be discarded, recycled, or otherwise utilized in other manufacturing processes. For example, during quality testing of the mold halves being produced by the mold, a testing apparatus may be inserted at the intermediate location which receives the released articles for testing purposes.

It is to be understood that control means may be provided to move the various elements of this apparatus in the desired sequence, and to interrupt or terminate operation of the apparatus under predetermined conditions. For instance, one or more timers may be provided and programmed to generate signals to initiate movement of the movable components of assemblies. Timers may also be provided and programmed to operate solenoid activated valves that connect bellows or suction plate receptacles to positive and negative pressure sources at the desired times. Position sensors may also be used to initiate movement of the movable elements of apparatus and to operate the above-mentioned valves, in response to various elements of the apparatus, such as vacuum head 102, the platform 34 of the second assembly 30, and the third assembly receiving plate 42, reaching predetermined positions. If desired, position sensors may be used to sense whether the movable elements of apparatus 10, such as the reciprocating cursol arm 104 and vacuum head 102, are moving between the appropriate locations.

In addition, sensors may be provided to determine if each of the recesses receives a respective one contact lens mold section from mold and to determine whether these contact lens mold sections are properly transferred from assembly to assembly. For example, such sensors may be located in and sense the pressures in the suction lines leading to the internal plenums or volumes of the assembly platforms.

To elaborate, when contact lens mold sections are properly mounted in the recesses of a platform element, for example, those lens mold sections close the ends of the internal volumes of the platform. If the contact lens mold sections do not provide the seal to the internal volumes, when the low pressure source is actuated, the pressure does not reduce to the proper securing level. Thus, the pressure inside the internal plenums through which the vacuum pressure is drawn is an indication of whether contact lens mold sections are mounted properly, and a pressure sensor may be employed to generate a signal or an alarm to indicate when a contact lens mold section is missing from one of the bellows.

The function and relation of all of the assemblies which comprise apparatus 10, which together are one embodiment of the present invention is complex, having been individually described in detail in the foregoing discussion. Referring now to FIG. 4, a time-position-function table showing the relative positions and functions carried out by all of the assemblies of this embodiment is shown. The back curve mold transport apparatus, which is the first embodiment of the present invention, having first, second, and third assemblies which function as described above, operates in the following manner. Beginning with the initial forward motion of the first assembly, the cursol arm is translated toward the molding station, which is still closed, forming the mold articles. As the cursol arm slides forward, the vacuum hand structure rotates into a vertical position so that the vacuum plate and the recesses there are properly oriented for receiving the mold articles. The cursol arm comes to a temporary halt as it waits for the mold station to open. Once the opposing elements separate, the cursol arm translates forward, positioning the vacuum plate adjacent to the mold station element to which the molded articles remain adhered to.

In this embodiment, it is important to note that the vacuum plate is coupled to the vacuum head by resilient means, for example silicone bellows and a linear slide. At this moment in the transport cycle, the vacuum plate is in its extended state as no vacuum can be maintained in the vacuum plate because the recesses of the plate are empty. A set of ejector pins within the molding station element are extended, therein pushing the molded articles out of the concave recesses in the molding station element, and pushing them into the recesses of the vacuum plate. If the ejector pins push the molded articles too far into the recesses, the bellowed mounting silicone cups are compressed under the load, moving the plate back, and therein ensuring that the mold sections are not damaged. If the mold sections are not pushed far enough into the recesses the subsequent act of drawing a vacuum in the plate will provide sufficient suction to draw the articles fully into the recesses.

In the fully inserted position, the external rim of the molded articles contacts the annular rim at the base of the vacuum plate recesses, therein together sealing the internal volume within the plate. The vacuum which is drawn in this volume of the plate secures the molded elements within the plate while simultaneously causing the silicone bellows to retract, thereby pulling the plate away from the mold and closer to the vacuum head.

It is understood that one skilled in the art might substitute equivalent means for resiliently mounting the vacuum plate to the vacuum head, for example with vacuum pistons and biasing springs, or with an actuatable air cylinder. These are equivalent means which, along with a myriad of other equivalencies, are anticipated herein and are within the broad scope of the invention.

Once the articles have been secured within the recesses, the cursol arm begins to reciprocate back toward the second location, to the waiting second assembly. As the cursol arm reciprocates back, the vacuum head is rotated down, so that the recesses of the plate are directed downward, the vacuum drawn in the plate keeping the articles within the recesses, and keeping the plate in a retracted position on the silicone bellows.

Once the first assembly has reciprocated all the way back to the second location, with the vacuum plate rotated down and disposed directly above the platform of the second assembly, the first assembly stops. The second assembly rises slightly via a vertical ballscrew mechanism, bringing its platform closer to the plate, with the recesses of each surface aligned for easy article transference. It is understood that a variety of equivalencies may be substituted for the ball screw mechanism for lifting the platform of the second assembly, such as a mechanically scissoring structure, a pneumatic, or hydraulic lift. These equivalencies are anticipated herein and are, therefore, incorporated as reasonable variations of the present embodiment.

At this moment the vacuum is released within the vacuum plate of the first assembly, therein releasing the vacuum grip on the mold articles. In some variations of his embodiment, the vacuum release is coupled with the application of positive pressure to ensure the ejection of the mold sections. In either case, the release of the vacuum causes the vacuum plate to extend downward to its extended position by the resilient coupling silicone bellows.

Once the articles have been transferred, the platform of the second assembly drops and begins to slide from the second location to the third location. As this happens the first assembly begins to reciprocate forward, and the vacuum plate rotates back into its vertical position (back in its extended state). By the time that the first assembly has rotated the plate vertically, and has halted in anticipation of the mold station opening, the second assembly has reached the third location, below the waiting third assembly and is stopped. The receiving plate of the third assembly drops down to meet the platform of the second assembly, and the articles are extracted by the receiving plate in a suitable manner, such as were more fully described above.

Once the articles have been extracted by the third assembly, the receiving plate rises up, is rotated 90 degrees (thereby rotating the articles) in the horizontal plane, and begins to slide back to the fourth location. Simultaneous with the third assembly rotating the receiving plate, the molding station separates and the first assembly enters to extract a new batch of articles from the station. At the same time, the second assembly reciprocates back to the left, moving back to the second location to receive the new batch of articles.

By the time that the third assembly reaches the fourth location, the first assembly has slid back to the second location and has rotated the hand to the horizontal position for depositing the articles into the platform recesses of the second assembly. At the fourth location, the third assembly drops down and deposits the articles, for example onto a pallet, in a manner which is both simultaneous with and similar to the deposition of the new batch of articles into the second assembly.

As the third assembly rises and rotates back to the orientation for receiving articles from the second assembly, the first assembly begins to slide forward again to extract another batch of articles which are being fabricated in the molding station, and the second assembly slides to the third location to give up its articles to the third assembly. Thus the repetitive cycle of the first apparatus, which is to transport a batch of back curve articles from a molding station at a first location to a fourth location, has been illustrated.

The advantage of this apparatus over a single assembly design in which the back curves are extracted from the molding station and moved to the manufacturing line by one assembly, is that the distance and velocity which each assembly needs to attain in the present invention is reduced during the transport of the same number of articles. This advantage is particularly important when the inertially imparted vibration associated with high speed translation is considered.

FRONT CURVE TRANSPORT ASSEMBLIES

Figure 5:
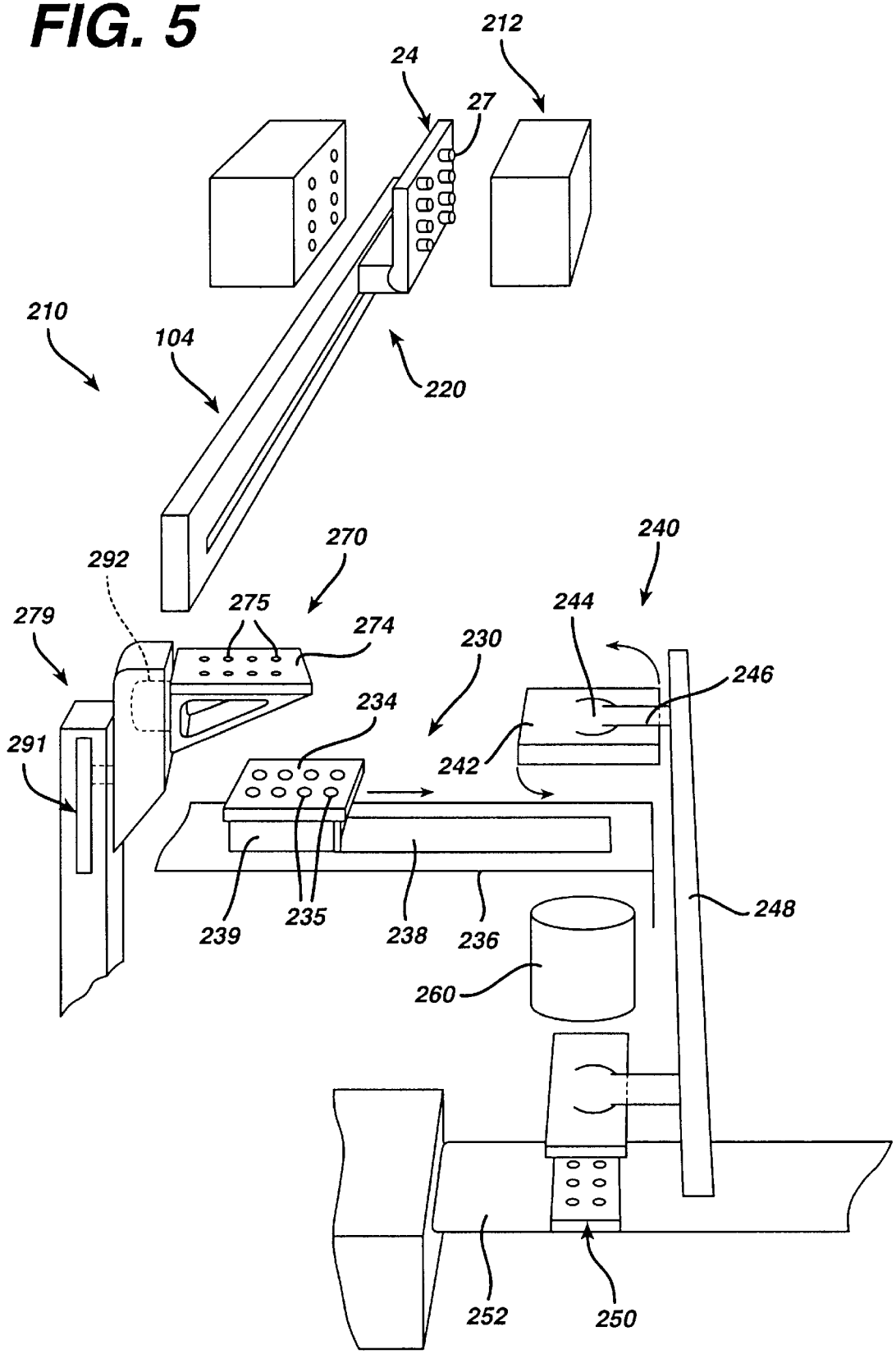
FIG. 5 is a simplified perspective view of the second apparatus according to the present invention.

Referring now to FIGS. 2b, 5–8, 13a–b, and 14, the second embodiment of the invention is the second apparatus 210, which is used to transport articles, such as the front curve contact lens mold halves, from a first location, such as an injection molding station 212, to a remote location, such as a pallet 250 on a contact lens fabrication line 252. This embodiment includes assemblies 220,230,240 which are very similar in form and function to the similar assemblies described above with respect to the apparatus which transports back curve mold halves from the mold to the pallet. The differences between the first and second apparatus being those related to the additional step of flipping the articles, the need for which was described earlier. The front curve mold articles are fabricated in an injection molding station comprising two mated opposing elements, the first of which has a regular array of convex protuberances which are aligned with an array of concave recesses in the opposing face of the second element. The optical shaping surface of the front curve mold half is the interior surface of the resultant cup. The manufacturing desirability of minimizing contact with the optical surface of the mold leads to the front curves remaining adhered to the convex protuberances upon separation of the mold station elements. The first assembly 220 of the second apparatus 210, which is shown in FIG. 5, and more particularly in FIG. 2b, therefore, extracts the articles from their convex side (at the annular ring which extends beyond the edge of the cup 452, as shown in FIGS. 13a and 13b).

With particular reference now to FIGS. 2b, 5, and 14, the vacuum head structure 102 of first assembly 220 comprises a hand 102 which includes an array of resilient fingers 22, extending uniformly from a vacuum plate 24 which is coupled to the cursol arm 104 via the mounting means and the timing belt. The fingers 22 are ideally suited to receive contact lens mold articles from the molding machine 212 after the opposing elements separate, and to releasably hold the received articles while the hand 102 and cursol arm 104 translate back from the first location to the second location.

The embodiment of the vacuum hand 102, illustrated in FIGS. 2b, 5, and 14, shows finger 22 as having a bellows structure 410. This bellows structure enables the fingers 22 to retract if an external pressure (or internal vacuum) is applied. In the forward most extended position, the hand 102 and cursol arm 104 align the bellowed fingers 22, which are in their fully extended state as well, between the separated opposing elements of the molding machine 212, as shown in FIG. 5. In this position, each of the fingers 22 is aligned with a respective one of the convex protuberances of the corresponding opposing element (not shown) and, thus, with a respective one of the articles formed in those mold cavities. Ejector pins (not shown) are used to push the formed articles off the convex protuberances and into engagement with the extended bellowed fingers 22.

With particular reference to FIG. 14, each of the bellowed fingers 22 preferably has an axially extending annular section 412 that forms an extended suction-cup shaped tip 414 on which the contact lens mold sections are placed. In particular, when a front curve is transferred onto one of the fingers 22, the annular flange 402 of the front curve makes contact with the extending annular suction-cup tip 414 of the bellowed finger 22, therewith forming a sealed volume 416 within the finger. In this way, the optical surface 401 is not touched by the bellowed finger 22.

As stated above, the bellowed fingers 22 extend outward from a vacuum plate 24, the vacuum plate comprising at least one internal plenum 418 connecting the volume within the suction cup tips 414 of the bellowed fingers 22 in gas flow communication with vacuum lines 26. In the embodiment shown in FIGS. 2b and 14, the individual vacuum lines 26 merge at a node 28 to form a single vacuum line 32. The low pressure which may be drawn by a vacuum venturi (not shown) in the suction cup tips 414 of the bellowed fingers 22 is useful for handling the articles being transported. In particular, a low pressure may be developed inside bellows 410 to help move the articles onto the bellows from mold recesses and that low pressure may be maintained in the bellows to help hold the articles thereon as the hand 102 is translated to the second location. When the low pressure is drawn, the bellowed fingers 22 retract toward the vacuum plate 24 in accordance with their resiliency.

The low pressure source that is connected to bellows vacuum plate 24 may be, for example, a vacuum venturi or a vacuum pump, or a source of pressure, referred to as a negative pressure, that is less than the ambient pressure. Also, preferably, that at least one internal plenum 418 within the vacuum plate 24, which connect each of the bellowed fingers 22 of the hand 102, is a single common plenum which connects the fingers to the vacuum line. In a preferred variation of the illustrated embodiment, a solenoid controlled valve (not shown) may be located in the vacuum line 32 to selectively seal and release the vacuum in the plenum and, therethrough, selectively evacuating and releasing the vacuum in the bellowed fingers 22.

As stated above, the bellowed fingers 22 are compressible so that they may dampen and absorb the energy and momentum of the contact lens mold sections as those mold sections are transferred from mold 12 to the fingers 22. In this way, the contact lens mold sections can be transferred from mold 212 to the bellows 22 at a relatively high speed without damaging or deforming the contact lens mold sections, even if those mold sections are not completely solidified or hardened when they are transferred to the bellows. Problems associated with mechanical variation in separation distance of the opposing elements interfering with consistent and proper removal of the mold halves from the mold 212, are solved with resilient and compressible fingers 22.

A means for providing a positive pressure within the bellowed fingers 22 may also be provided, via the same vacuum line 32 through which the vacuum is drawn, and may be controlled by the same solenoid valve (not shown). This positive pressure may be used, if necessary to break any mechanical sealing which may develop between the mold section and the tip 414 of the bellowed finger 22.

As may be clearly understood, the first assemblies of the first and second apparatus differ. In the first apparatus a vacuum head, coupled to a vacuum plate with recesses is used; in the second bellowed fingers extending from a vacuum plate is used. In the first apparatus, because the back curves are received in an orientation having the mold halves oriented so that they are extending outward with respect to the receiving plate, in order to ensure that the vulnerable convex surface will not be damaged in transport, the preferred variation is the vacuum plate with recesses. In the second apparatus, because the front curves are extracted from the molding station in an orientation having its convex surface facing inward with respect to the plate, the preferred variation comprises the resilient bellowed fingers.

Both preferred variations of the first assembly comprise a horizontal arm which reciprocates a vacuum hand between a first location and a second location via a ball screw and a timing belt, and are ideally suited for holding their corresponding curve articles by suction means. In this second apparatus, however, the first assembly 220 does not place the articles which it collected from the molding station 212 at the first location into a second assembly. Rather, it places the articles in the recessed ports of a flipper platform 274.

Figure 6:
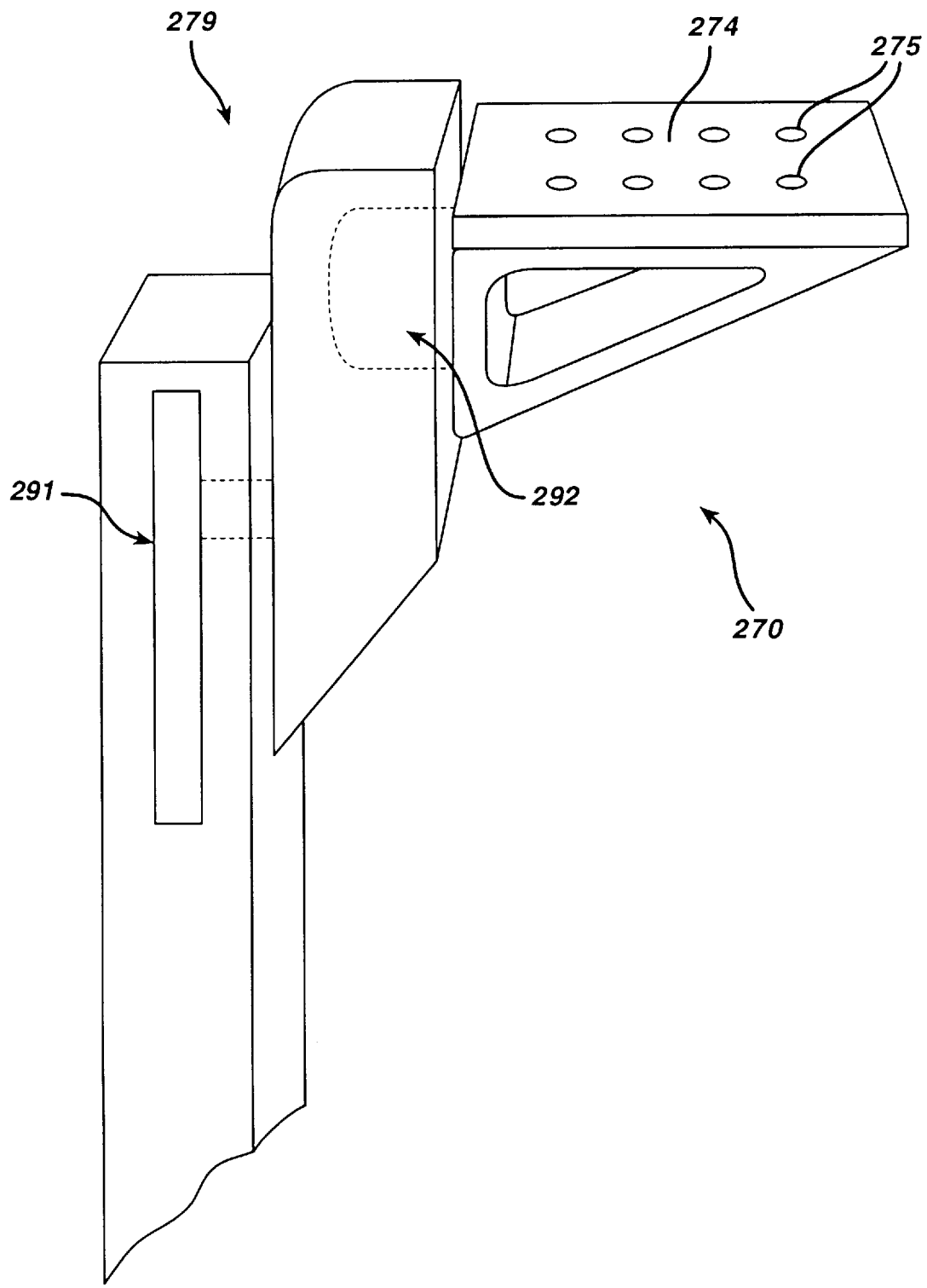
FIG. 6 is a perspective view of the flipper assembly which is included in the apparatus shown in FIG. 5.

Referring now, also, to FIG. 6, the action of the fingers of the first assembly 220 are particularly suited for both receiving the front curves from the molding station 212 and the deposition of the curves into the flipper assembly 270. At the mold station, ejector pins push the articles out to contact the tips 414 of the fingers 22, whereupon a vacuum is drawn in the interior volume 416 of the finger tips which secures the articles thereto. The vacuum also causes the bellowed fingers 22 to retract away from the mold element, therein providing additional clearance for the hand as it reciprocates away from the molding station.

To ensure the smooth operability of the first assembly, it may be desirable to couple various the appending wires, hoses or flexible lines together and to one of the structural elements, for example the stationary support subassembly to guide any such wires or lines and to help insure that these wires or hoses do not become entangled with one another as the hand 102 and cursol arm 104 reciprocate. This same expedient may be incorporated into the embodiments of each assembly of the invention, in each apparatus.

Once the hand 102 has rotated downward and is positioned to drop the secured articles into the flipper 270 assembly, the vacuum is released within the finger tips 414. The combined effects of gravity and the extending fingers 22 provides ample force for the articles to be gently pushed from the tips 414 of the fingers. A variation of this embodiment includes a positive pressure means coupled to the vacuum line for providing an additional pressure to the articles from within the tips to ensure that they are deposited by the fingers.

It is understood that the articles, when transported by the first assembly 20 of the first apparatus 10, are carried to the second location where the convex surface of the articles face downward. They are subsequently deposited into each of the subsequent assemblies of the apparatus with the convex surface facing down, and are ultimately placed into a pallet with their convex surfaces down. In the second apparatus 210, the first assembly 220 extracts the articles and carries them to the second location with the convex surfaces facing upward.

The second apparatus 210, therefore, includes an additional assembly 270 which receives the articles from the first assembly and flips them before depositing them in the second assembly. In this way the articles are positioned to be ultimately deposited in a pallet with convex surface down.

The flipper element 270 comprises a substantially flat platform 274 having a regular array of recesses 275 therein for receiving a plurality of articles. The platform 274 is mounted to a motive structure 279 which provides for independent vertical and rotational movement, whereby the platform may be raised to meet the fingers of the first assembly and then drop away, thereby providing sufficient spacing for the platform to flip over. While it is understood that a variety of means may be employed which achieve the vertical axis motion and the rotational motion described herein, the preferred embodiment of this assembly comprises a vertical ball screw mechanism 291 mounted within the base of the motive structure 279, and a rotating air cylinder 292 for rotation.

It is understood that the recesses 275 of the flipper assembly are preferably coupled to a vacuum means so that the articles may be secured within the recesses during inversion. In addition, it is highly preferable that the vacuum means be selectively disengagable so that the articles may be reliably released from the recesses 275 when deposition of the articles into the second assembly is appropriate.

Once the platform 274 has inverted, therein inverting the articles disposed therein, the flipper 270 drops the articles into the recesses 235 of a second assembly 230 which is generally similar to the second assembly 30 of the first apparatus 10. This version of the second assembly comprises a platform 234 having recesses 235, a translating carriage structure 239, and a support frame 236 forming linear tracks 238 along which the translating carriage structure 239 reciprocates from the second location to the third location. As before, as well, this version of the invention includes means within the support frame 236 for lifting the platform 234 vertically to meet the flipper element and to receive the articles therefrom with the least exposure of the molds. It is understood that a variety of different means for lifting the platform would be suitable, for example a selectively extendable piston coupled between the bottom of the platform and the carriage structure, or a ballscrew and motor drive system. In the preferred embodiment of both variations of the second assembly 30, 230, the translation means in both the horizontal and vertical planes are both ball screw mechanisms, one having a vertical orientation, the other being horizontal. It is desirable for the horizontal ball screw element to be mounted within the support frame 236, and for the vertical ball screw element to be mounted in the translating carriage structure 239.

Once the articles have been placed into the recesses 235 of the second assembly 230, the platform is lowered and translated to the third position via the translating carriage structure 239 which moves horizontally along tracks 238. At the third location the lifting means again raises the platform 234, this time to meet the third assembly 240, which extracts the articles therefrom.

The third assembly 240 of the second apparatus 210, which comprises a similar set of elements as the third assembly 40 of the first apparatus 10, further has a support body 246 which is motively coupled to a track 248 which has means for translating the assembly from the third location to the fourth location, and to lower (and raise) the platform to (from) the second assembly 230 or the pallet 250 during exchange of the articles. As before, it is preferred that ball screw elements, both horizontally and vertically oriented be used to motively translate the appropriate assembly elements. In addition, also, the third assembly 240 rotates in the horizontal plane while transporting the articles to the fourth location for deposition, for example into a pallet. The means for imparting the rotation is preferably an air cylinder, having 90 degree rotation stops. As in the first apparatus, if the appropriate pallet 250 is not present at the fourth location at the appropriate time for deposition, the third assembly 240 transports the articles back to an intermediate position, between the third and fourth locations, and releases the articles into a bin 260.

It is to be understood that, as with respect to the first apparatus, control means may be provided to move the various elements of this apparatus in the desired sequence, and to interrupt or terminate operation of the apparatus under predetermined conditions. For instance, one or more timers may be provided and programmed to generate signals to initiate movement of the assemblies. Timers may also be provided and programmed to operate solenoid activated valves that connect the bellowed fingers of the first assembly, vacuum head, and the vacuum lines to positive and negative pressure sources at the desired times. Position sensors may also be used to initiate movement of the assemblies and to operate the above-mentioned valves, in response to various other assembly parts such as the vacuum hand, the flipper assembly, or the second assembly reaching their corresponding predetermined positions.

In addition, sensors may be provided to determine if each of the bellowed fingers 22, or the recesses in the platforms of subsequent assemblies, receives a respective one contact lens mold section from the mold. Sensors may further by employed to determine whether the contact lens mold sections are properly transferred from the first assembly to subsequent assemblies. For example, such sensors may be located in and sense the pressures in the suction lines leading to the bellowed fingers, recesses, and vacuum platforms of the flipper, second and third assemblies.

To elaborate, when contact lens mold section are properly mounted on all of the bellowed fingers 22, and the bellows 410 are connected to a low pressure source, the pressure inside the internal plenums 418 and lines 26 leading to the fingers is reduced to a predetermined level. In contrast, if contact lens mold sections do not seal the tips of all of the bellows fingers 414, when those bellows 410 are connected to the low pressure source, the pressure inside the lines 26 and plenums 418 is not reduced to the vacuum securing level. Thus, the pressure inside the lines and internal plenums is an indication of whether contact lens mold sections are mounted on all of the bellows, and a pressure sensor may be employed to generate a signal or an alarm to indicate when a contact lens mold section is missing from one of the bellows.

The most important difference between the first apparatus 10 and the second apparatus 210 is understood to be the inclusion of an additional assembly 270 which flips the articles over. The function and relation of all of the assemblies which comprise apparatus 210, which together form the second embodiment of the present invention, having been individually described in detail in the foregoing discussion are now described in relation to one another.

Referring now to FIG. 8, a time-position-function table showing the relative positions and functions carried out by all of the assemblies of this embodiment is shown. The front curve mold transport apparatus, which is the second embodiment of the present invention, having first, flipper, second, and third assemblies which function as described above, operates in the following manner. Beginning with the initial forward motion of the first assembly, the cursol arm is translated toward the molding station, which is still closed, forming the mold articles. As the cursol arm slides forward, the vacuum hand structure rotates into a vertical position so that the vacuum plate and the fingers which extend outwardly therefrom are properly oriented for receiving the mold articles. The cursol arm comes to a temporary halt as it waits for the mold station to open. Once the opposing elements separate, the cursol arm translates forward, positioning the bellowed fingers adjacent to the mold station element to which the molded articles remain adhered. It is important to note that, with no artificially applied force, the resilient bellowed fingers are in their extended state.

Once the fingers are in position, a set of ejector pins within the molding station element are extended to push the molded articles off the convex protuberances to which the articles have adhered and onto the tips of the bellowed fingers. The bellowed fingers have a cup shaped tip, the external rim of which contacts the annular rim of the molded article, therein together forming sealed internal volumes in each of the bellowed fingers. If the ejector pins push the molded articles beyond the tips, the resilient fingers compress under the load, therein ensuring that the mold sections are not damaged. If the mold sections are not pushed far enough outward toward the fingers, the subsequent drawing of a vacuum in the fingers provides sufficient suction to draw the articles fully onto the finger tips. By drawing a vacuum in this volume, the first assembly secures the molded elements to the fingers while simultaneously causing the bellowed fingers to retract. In this partially retracted state the length of the fingers may be reduced by as much as half.

Once the articles have been secured to the tips of the fingers, the cursol arm begins to reciprocate back toward the second location, to the waiting flipper assembly. As the cursol arm reciprocates back, the hand rotates down, so that the retracted fingers are directed downward. The vacuum drawn in the hand keeps the articles secured to the tips of the fingers.

Once the first assembly has reciprocated all the way back, with the vacuum plate rotated down and disposed directly above the platform of the flipper assembly and the fingers aligned for deposition of the articles into the recesses of the platform, the flipper assembly rises slightly. The release of the vacuum in the fingers (or the application of a positive pressure) causes the articles to drop from the tips of the fingers into the recesses of the flipper plate.

Once the articles have been deposited a vacuum is drawn in the flipper plate to secure the articles within the recesses. At this point the articles are still oriented with their convex sides directed upward. The flipper plate drops down from its slightly elevated position and rotates 180 degrees, turning the platform over and correspondingly inverting the mold sections.

At the time that the flipper plate rotates, the first assembly begins to move forward toward the molding station and that vacuum head reorients into a vertical alignment.

The transference of the articles from the flipper assembly to the second assembly occurs next. The second assembly rises up to meet the inverted flipper assembly such that the recesses in the platforms of each assembly are aligned. At this moment the vacuum is released within the flipper assembly (and preferably a positive pressure is applied), therein releasing the vacuum grip on the mold articles. At this time a vacuum may be drawn in the recesses of the second assembly as a precaution to insure the secure fixation of the articles within the recesses.

Once the articles have been transferred, the platform of the second assembly drops and begins to slide from the second location to the third location. As this happens the platform of the flipper assembly rotates back so that its recesses are facing upward to anticipate the arrival of the next batch of articles. At this time also, the mold station separates allowing the first assembly in to retrieve the next batch of articles.

By the time that the first assembly has entered the mold station, the second assembly has reached the third location, and is positioned below the waiting third assembly. The receiving plate of the third assembly is lowered, by means of the articulated shaft assembly of the mounting, to meet the platform of the second assembly. The second assembly rises slightly to meet the lowered plate of the third assembly, in order to make the transference as quickly as possible.

The manner in which the articles are transferred from the second assembly to the third assembly may be achieved in two different ways, each of which is functional, but each comprising different embodiments of the third assembly. Both variations include ejector pins in the platform of the second assembly which push the articles out of the recesses of the platform and push them to a position from which they may be easily received by the third assembly. In the first variation, the third assembly comprises a vacuum plate which has recesses, into which the raised articles are pushed, after which a vacuum system is engaged to secure the articles in place. In the second variation, the third assembly comprises an array of bellowed fingers, similar in function to the bellowed fingers of the first assembly, onto which the ejector pins push the articles. A vacuum system is subsequently engaged to secure the articles in place.

Once the articles have been extracted by the third assembly, the receiving plate rises up, is rotated 90 degrees (thereby rotating the articles) in the horizontal plane, and begins to slide back to the fourth location. Simultaneous with the third assembly rotating the receiving plate, the second assembly drops down and slides back to the second location to receive the next batch of articles from the flipper assembly. At this time, the molding station has separated and the first assembly has entered and extracted the new batch of articles from the station.

By the time that the third assembly reaches the fourth location and drops to deposit the articles in a receptacle, such as a pallet, the first assembly has slid back to the second location and has rotated the hand to the horizontal position for depositing the articles into the platform recesses of the flipper assembly. The flipper assembly has correspondingly risen to receive the next batch of articles, as the second assembly has arrived at the second location and prepares to rise to receive the articles from the flipper, once it has rotated.

As the fourth assembly rises and rotates back to the orientation for receiving articles from the second assembly, the first assembly releases the articles into the flipper assembly and the repetitive cycle of the apparatus begins again.

The operation of the above-described apparatus 210, as each set of contact lens mold sections is moved from mold to one of the pallets, the spatial relationships of the lens mold sections in the set are preserved. In particular, the lens mold sections in each set of lens mold sections form a matrix array that is preserved as the lens mold sections are moved through apparatus.

Throughout this repetitive cycle, and continuing down the assembly line, a spatial relationship may be preserved between the lens mold sections after they are placed in pallets and even during subsequent handling or use of the lens mold sections, and a spatial relationship may be preserved between the contact lenses formed between each pair of line mold sections. Under these circumstances, the spatial position of the mold sections and even of the formed contact lenses indicate the mold cavity in which either the mold sections or the mold sections add to make the contact lenses were made. In this case, if flaws are detected in contact lenses, and operator can readily determine the mold cavity or cavities in which the lens mold sections, which were used to make the contact lenses, were themselves made.

PACKAGING TRANSPORT ASSEMBLIES

Unlike the front and back curve mold transport apparatus, the packaging transport apparatus does not maintain the spatial relationship of the articles as a constant through the transport from mold station to pallet, but translates the array in a predetermined manner, which if desired, would enable tracking of individual articles from individual mold stations.

The third embodiment, described hereinbelow, is an apparatus which is directed to the removal, transport, and depositing of injection molded articles which form the package recepticle in which contact lenses may be inspected, stored, shipped, and/or sold.

Referring now to FIGS. 2c, 9–12, and 14, the third apparatus comprises assemblies which are generally similar to the common assemblies of the embodiments described previously. The general assemblies are a first 320 for removing the molded packaging articles from a molding station to a second location, a second 330 for transporting the articles from a second location to a third, and a third assembly 340 for removing the articles from the second assembly at the third location and transporting them to a receiving structure 350 at a fourth location, for example a pallet on a manufacturing line 52. The specific differences between the previous apparatus and the present apparatus, as alluded to above, is that the second and third assemblies 330, 340 of this apparatus 310 carry out the additional steps of altering the spatial loci of the articles with respect to one another. The spatial relationship of the articles, and their array relationship is altered from an original 4×4 array, which is desirable from a mold efficiency standpoint to a 2×8 array which facilitates optical inspection by automated lens inspection system.

The first assembly 330 of this apparatus is structurally similar to the first assembly 220 of the front curve transport apparatus in that it preferably comprises a vacuum head 302 having bellowed fingers 22 which extend outward from a vacuum plate 324, and which receive the packaging articles at the tips 414 of those fingers 22. The operative timing of this assembly, especially with respect to the functions of the other assemblies is particular to this apparatus, and shall be discussed below, with respect to FIG. 12.

The second assembly 330 comprises a set of parallel elongate blocks 334, preferably four, coupled to one another in a substantially co-planar manner, whereby the top surfaces of the blocks 334 define a platform. Each of the elongate blocks 334 includes a row receiving ports 335 in the surface thereof, for receiving articles deposited thereon by the first assembly 320. The number of receiving ports 335 per block 334 is also preferably four, wherein the total number of ports is sixteen, in a biaxially perpendicular array of four by four. For the purposes of describing the operative function of this element, the array of receiving ports may be divided into two groups, a right group 337 and a left group 333. The right group 337 is defined as the two by four array which is the right half of the receiving ports 335, the left group 333 is defined as the two by four array which is the left half of the ports. The blocks 334 are held in the parallel alignment by a pair of linear guide rails 370, on which rails the blocks may be translated along a single axis. The means of this translation is a set of hydraulic piston/cylinder elements 371,372.

Figure 10:
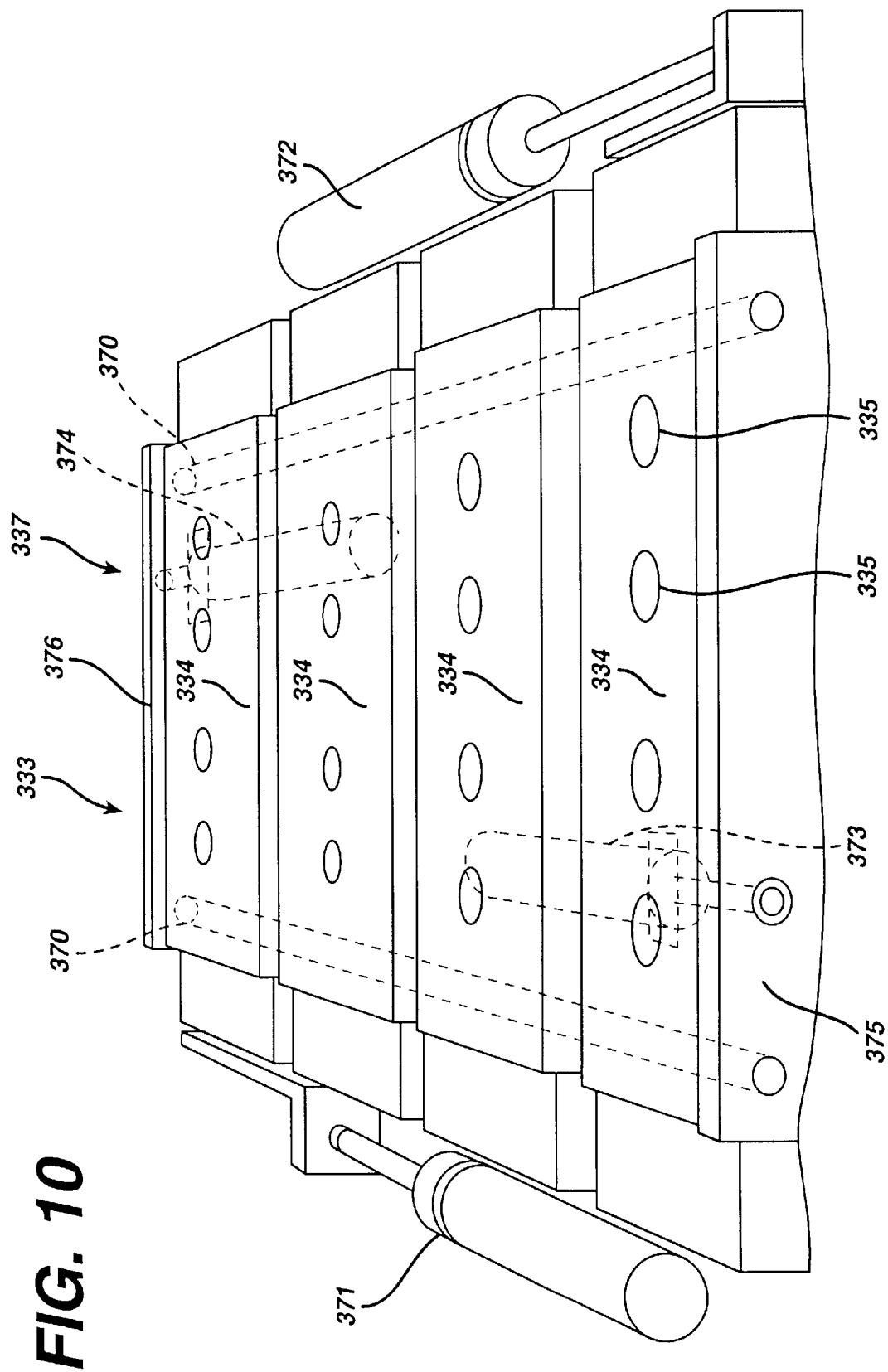
FIG. 10 is a perspective view of the collapsing second assembly which is included in the third apparatus shown in FIG. 9.

More specifically, the blocks 334 may be laterally repositioned, reciprocated between an open and a closed position, with respect to one another by means of extending and retracting piston/cylinder elements 371,372 to which the blocks are motively coupled. Referring now particularly to FIG. 10, the blocks 334 of this assembly are shown in an open position. In this illustration the first and third blocks are coupled by one piston cylinder assembly 371, whereby retraction of the piston draws them together. The third and fourth blocks are similarly mounted to a second piston/cylinder element 372 which can draw the fourth block toward the third. A set of secondary piston/cylinders 373,374 are coupled to the outer blocks and to guide plates 375,376, and, when actuated, draw the guide plates together into the blocks, thereby centering the blocks in accordance with their proper compactified position.

The articles are deposited by the first assembly 320 onto the platform (blocks 334) of the second assembly when the blocks are in their open position.

In operation, from an open position, the first and third blocks are drawn together by retraction of the first piston 371, then the second piston 372 draws the fourth block in. Once the guide plates 375,376 are drawn into the blocks, to center them, the fully retracted position the blocks are in full contact with one another and therein define a continuous platform. Articles deposited on the receiving ports 335 of the blocks 34 when the blocks are separated are thereby spatially reoriented with respect to each other in the one direction of retraction.

The entire block and piston subassembly is mounted to a frame 339 which is in turn mounted to a vertically lifting means for raising and lowering the platform during deposition or retrieval of the articles thereon. This vertically lifting means may comprise a hydraulic lifting piston, a ballscrew element, a pneumatic lift, a mechanically scissoring lift means, or any other suitable means for selectively raising and lowering the frame to which the blocks and pistons are mounted. In the preferred embodiment, the vertically lifting means is a vertically oriented ball screw mechanism.

It is further understood that equivalent means could be substituted in the second assembly for the piston/cylinder elements 371–374 which retract and separate the blocks 334 and the guide plates 375,376. Such equivalent means include mechanically scissoring extension means, ballscrew elements, geared wheel and track elements, and other motive means.

All of the above described elements of the second assembly 330 of the third apparatus are mounted on a track 338 which permits the entire assembly to reciprocate between second and third locations. This track comprises a second ball screw mechanism for translating the assembly. Other equivalent means are functionally similar and may be substituted, but the preferred mechanism is the ball screw.

Figure 11:
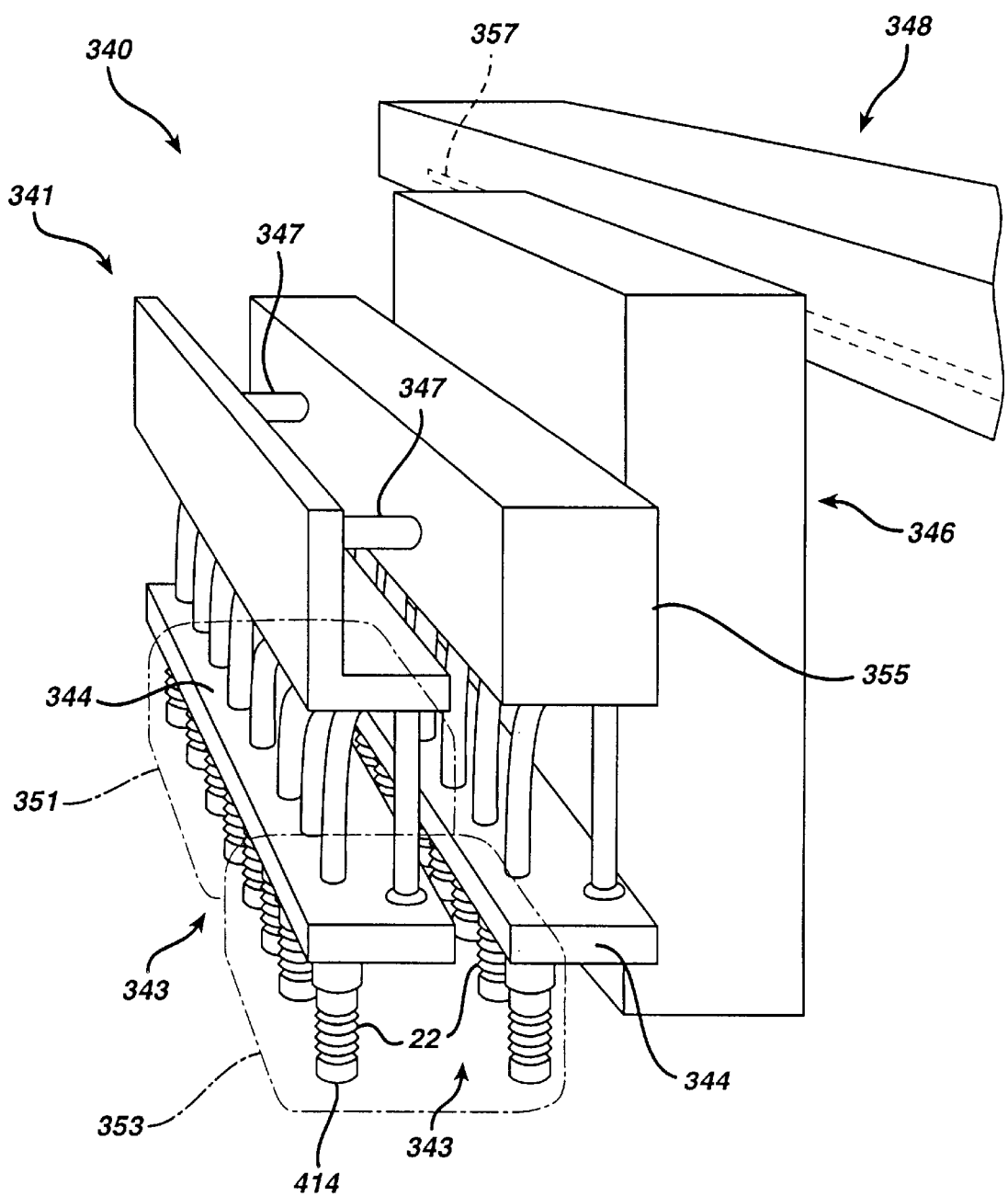
FIG. 11 is a perspective view of the third assembly of the third apparatus as shown in FIG. 9.

Referring now, also, to FIG. 11, the third assembly 340, which picks up and deposits the articles at a fourth location, such as a pallet 350, suited for receiving the articles, is shown. In this embodiment, the third assembly comprises a vacuum head 341 mounted to a support body 346, which is in turn coupled to a track 348 on which the vacuum head 341 and the support body 346 reciprocate horizontally from the third location to the fourth location. It is understood that the motive means by which the vacuum head reciprocates may comprise a variety of equivalent means, for example a geared track and a motor driven geared wheel or a hydraulic piston. The preferred means is a ball screw mechanism.

The vacuum head 341 itself is comprised of separate horizontal columns 343 of bellowed fingers 22. In the illustrated variation of this assembly there are two separate parallel columns 343 of fingers 22 which descend from two separate parallel vacuum plates 344. These horizontal columns 343 of fingers extend in the same direction as the reciprocating axis of the third assembly, and are together correspondingly perpendicular to the blocks (and receiving ports 335 thereon) and reciprocating axis of the second assembly. In the preferred variation, the spacing of the fingers 22 of each plate 344 with respect to the adjacent fingers 22 of the same plate, is equal to the spacing of the 334 blocks of the second assembly 330 when they are in their retracted position.

The separate vacuum plates 344 are coupled to the vacuum head 341 so that they may be reciprocated laterally with respect to one another, whereby the columns 343 of fingers 22 may be moved closer or farther apart from one another. The preferred means by which this reciprocation is actuated is by at least one small linear air piston/cylinder 347, although a ball screw mechanism would be an acceptable substitute. The air cylinder is preferred for weight minimization reasons. This relative repositioning, which is uniaxial, maintains the columns 343 of fingers 22 in a substantially parallel alignment.

In the preferred variation, the number of bellowed fingers 22 per column 343 is equal to twice the number of blocks 334 in the second assembly 330, therein defining a two by eight array of fingers 22. For the purposes of this description it is understood that this array of fingers 22 may be divided into a front group 351 and a rear group 353, wherein the front group is defined to be the two by four array of fingers 22 which is disposed on the vacuum head 341 closest to the molding station 312, and the rear group 353 is defined to be the two by four array of fingers which is farther from the molding station 312. This division of the fingers into two groups is not purely semantic, as the fingers 22 of the front group 351 are coupled to one common vacuum drawing means, and the rear group 353 is coupled to a separate vacuum drawing means. (It is understood that, in another variation, the two groups may be separately selectively coupled—by a solenoid—to the same vacuum drawing means.)

In addition, the support body 346 further comprises a vertical ball screw mechanism 355 for raising and lowering the vacuum head 341 into position for receiving and depositing the articles.

The operation of the second and third assemblies 330,340 with respect to one another is carried out in two steps. The first step of the operation is to move the vacuum head 341 of the third assembly 340 fully forward to a first position at the third location. The second assembly 330 is simultaneously moved along a perpendicular axis to a second position, which is below the third assembly. In these corresponding positions the rear group 351 of fingers 22 of the third assembly 340 is aligned above the right group 337 of receiving ports 335 in the platform (compact blocks 334) of the second assembly 330. Once the assemblies are so aligned, the vacuum head 341 drops down so that the corresponding fingers 22 of the rear group 353 of the third assembly contact the articles in the right group 337 of receiving ports. A vacuum is then drawn in the fingers 22 of the rear group thereby securing the articles to the tips 414 of the fingers as the vacuum head 341 is raised by the vertically aligned ball screw mechanism in the support body 346.

The second assembly 330 then continues to the right, moving into the third position of the third location. The third assembly 340 simultaneously reciprocates the raised vacuum head 341 backward, by means of the horizontally aligned ball screw 357, to a position directly above the second assembly. It is understood that the relative motion of the two assemblies is perpendicular as the axes along which the assemblies are translated are perpendicular. At this position the left group 333 of receiving ports 335 is aligned with the front group 351 of fingers 22 above. At this position the vacuum head 341 is lowered again to receive the second half of the articles which were deposited on the platform of the second assembly. Again, a vacuum is drawn, this time in the front group 351 of fingers 22, and the second set of articles are secured to the tips 414 of the fingers 22. The vacuum head 341 of the third assembly 340 is then lifted and reciprocated to the fourth location, and the second assembly 330 translates back to the second location. The second assembly must first expand into the article receiving configuration, and then it receives a new batch of packaging articles from the first assembly 320.

The uniaxial drawing together of the blocks 334, and thereby the articles, of the second assembly alters the spacing of the articles along a first axis. The transference of the articles from the second to the third assembly alters the relative distribution of articles, from a four by four array to a two by eight array. The drawing together of the vacuum plates 344 of the third assembly, during the reciprocation back to the fourth location, completes the two axis spatial distribution change in the separation distance of adjacent articles. The 2×8 pallet 350 which receives the articles at the fourth location is correspondingly characterized by a matching array of receiving ports which is aligned to the altered distribution of the articles.

Referring now to FIG. 12, the time-function chart of the packaging transport apparatus shown. The third embodiment of the present invention, having first, second, and third assemblies which function as described above, operate in the following manner. Beginning with the initial forward motion of the first assembly, the cursol arm is translated toward the molding station, which is still closed, forming the mold articles. As the cursol arm slides forward, the vacuum hand structure rotates into a vertical position so that the vacuum plate and the fingers which extend outwardly therefrom are properly oriented for receiving the mold articles. The cursol arm comes to a temporary halt as it waits for the mold station to open. Once the opposing elements separate, the cursol arm translates forward, positioning the bellowed fingers adjacent to the mold station element to which the molded packaging articles remain adhered. It is important to note that, with no artificially applied force, the resilient bellowed fingers are in their extended state.

Once the fingers are in position, a set of ejector pins within the molding station element are extended to push the packaging articles out of the mold and onto the tips of the bellowed fingers. The bellowed fingers have a cup shaped tip, the external rim of which contacts a flat surface of the molded article, therein together forming sealed internal volumes in each of the bellowed fingers. If the ejector pins push the molded articles beyond the tips, the resilient fingers compress under the load, therein ensuring that neither the fingers nor the molded articles are damaged. If the mold sections are not pushed far enough outward toward the fingers, the subsequent drawing of a vacuum in the fingers provides sufficient suction to draw the articles fully onto the finger tips.

By drawing a vacuum in this volume, the first assembly secures the articles to the fingers while simultaneously causing the bellowed fingers to retract. In this partially retracted state the length of the fingers may be reduced by as much as half.

Once the articles have been secured to the tips of the fingers, the cursol arm begins to reciprocate back toward the second location, to the waiting second assembly. During this stroke of the reciprocation the vacuum head of the first assembly rotates horizontally and pauses at an intermediate location. If the second assembly is not in proper receiving position, the vacuum in the fingers is released and the articles secured thereto are dropped into a receiving bin. In this event, the cursol arm is translated back to the waiting position in front of the molding station, the vacuum head is rotated to a vertical orientation, and the first assembly prepares to extract another set of articles once the mold station opens.

In the case that the second assembly is in proper receiving position at the second position, the first assembly continues from the intermediate position to the second location for deposition of the articles onto the second assembly. Once the assemblies are properly positioned, the second assembly rises up so that the fingers extending downward from the horizontal vacuum plate, and the articles secure thereto contact the receiving ports of the second assembly. At this time the vacuum in the fingers is released and a vacuum in the receiving ports is drawn, therein securing the articles to the blocks.

As the vacuum hand rotates vertically and the cursol arm translates forward from the second location, the second assembly drops back to its reciprocating position and begins the operation of altering the spatial separation of the blocks with respect to one another. The step of the drawing together of the blocks to the retracted position happens in three stages, via the contraction of three piston/cylinder assemblies; the first step being the drawing together of the inner two blocks, followed immediately by the outer two blocks, and followed thereby the contraction of the guide plates.

Once the guide plates have been contracted the second assembly slides to the right, to an intermediate position (the second position of the third location) and waits for the third assembly to position its rear group of fingers above the right group of receiving ports. With the receiving ports positioned below, the vacuum head of the third assembly drops, via the vertical ballscrew drive, to pick up the first half of the articles.

Once the articles are secured to the fingers, by a drawn vacuum in the rear group thereof, the vacuum head of the third assembly is raised by the vertical ballscrew drive and is translated back toward the intermediate pick up position (the fourth position at the third location). Simultaneous with the motion of the vacuum head of the third assembly, the second assembly continues to move to the right, therein positioning itself so that the left group of receiving ports, and the remaining group of articles, are aligned below the front group of fingers of the third assembly.

Once the assemblies are properly aligned, the third assembly drops so that the front group of fingers contacts the left group of articles to pick them up. As the third assembly drops and picks up the second set of articles, the mold station opens and the first assembly slides into position to receive a new batch of articles.

Once the second set of articles has been picked up by the third assembly vacuum head, the vacuum head rises via the vertical ballscrew drive, and is translated back to the fourth location via the horizontal ball screw drive. As it travels back, the vacuum plates of the third assembly are drawn together by an air piston/cylinder to change the relative spacing of the articles.

It is as the third assembly moves together that the second assembly moves left, back into position to receive a new batch of articles from the first assembly. Once in position at the second location, the piston/cylinder elements of the second assembly extend, therein moving the blocks and guide plates into their spaced arrangement.

By the time the second assembly has reached the second location, the first assembly has already received the new batch of articles and is moving back to deposit them into the receiving ports of the second assembly as described above. It is as the first assembly is moving back to deposit the articles that the third assembly moves into position above the pallet at fourth location and the vertical ballscrew drive engages again to lower the vacuum head and fingers into contact therewith. Once in position to drop the articles, the third assembly releases its vacuum and the articles are deposited on the pallet.

Having deposited the articles, the third assembly rises and moves forward, during which time, the vacuum plates and fingers are moved apart to their positions for receiving the articles from the second assembly.

By means of this repetitive cycle the spatial relationship of the articles taken from the molding station may be altered to the distribution which is compatible with the pallet on which the articles are ultimately carried through the subsequent stations of the assembly line. While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. Apparatus for removing and transporting ophthalmic lens mold sections from a mold located at a first location, the apparatus comprising:

a first assembly for removing the lens mold sections from the mold and transporting the lens mold sections to a second location;

a second assembly for receiving the lens mold sections from the first assembly and transporting the lens mold sections to a third location;

a third assembly for receiving the lens mold sections from the second assembly and transporting the lens mold sections to a fourth location, wherein the third assembly includes i) a receiving plate forming a plurality of recesses for receiving the lens mold sections, ii) vacuum means in communication with the recesses for developing a low pressure therein for selectively and securely holding the lens mold sections in the recesses, iii) moving means connected to the receiving plate for moving the plate between the third and fourth locations, and iv) rotating means connected to the plate to change the orientation of the plate and of the lens mold sections therein.

2. Apparatus according to claim 1 wherein the plurality of recesses are provided by a corresponding plurality of bellowed fingers extending from the plate.

3. Apparatus according to claim 2 wherein each recess has an opening diameter which is larger than a diameter of the optical surface of each lens mold section, whereby each bellowed finger being capable of grasping and selectively and securably holding one of the lens mold sections via the corresponding recess without touching the optical surface of the lens mold section.

4. Apparatus according to claim 1, wherein the moving means includes:

a vertically oriented ball screw mechanism for raising and lowering the plate; and a horizontally oriented ball screw mechanism for translating the plate along a horizontal axis.

5. Apparatus according to claim 1, wherein the rotating means includes a rotating air cylinder having stops for selectively moving the plate between at least two orientations.

* * * * *

(12) REEXAMINATION CERTIFICATE (4688th)
United States Patent
Lust et al.

(10) Number: US 5,980,184 C1
(45) Certificate Issued: Dec. 24, 2002

(54) APPARATUS FOR REMOVING AND TRANSPORTING ARTICLES FROM MOLDS

(75) Inventors: Victor Lust, Orange Park, FL (US); Stephen Robert Beaton, Neptune Beach, FL (US); Scott Frederick Ansell, Jacksonville, FL (US); Henri Armand Dagobert, Jacksonville, FL (US); Phillip King Parnell, Sr., Jacksonville, FL (US); Craig William Walker, Jacksonville, FL (US); Daniel Tsu-Fang Wang, Jacksonville, FL (US)

(73) Assignee: Johnson & Johnson Vision Products, Inc., New Brunswick, NJ (US)

Reexamination Request:
No. 90/005,885, Dec. 11, 2000

Reexamination Certificate for:
Patent No.: 5,980,184
Issued: Nov. 9, 1999
Appl. No.: 09/048,859
Filed: Mar. 26, 1998

Related U.S. Application Data

(63) Continuation of application No. 08/431,884, filed on May 1, 1995, now abandoned, which is a continuation-in-part of application No. 08/258,267, filed on Jun. 10, 1994, now abandoned.

(51) Int. Cl.⁷ ............................................. B65G 47/74
(52) U.S. Cl. ............................. 414/226.01; 414/752.1; 901/8
(58) Field of Search ....................... 414/225.01, 226.01, 414/751.1, 752.2, 793, 797; 901/7, 8, 40

(56) References Cited

U.S. PATENT DOCUMENTS

| | | | |
|---|---|---|---|
| 3,542,224 A | 11/1970 | Warren | |
| 4,411,574 A | 10/1983 | Riley | |
| 4,444,423 A | 4/1984 | Montferme et al. | |
| 4,444,424 A | 4/1984 | Lebret | |
| 4,495,313 A | 1/1985 | Larsen | |
| 4,565,348 A | 1/1986 | Larsen | |
| 4,571,320 A | 2/1986 | Walker | |
| 4,576,560 A | * 3/1986 | Herman | 414/225.01 |
| 4,611,749 A | 9/1986 | Kawano | |
| 4,640,489 A | 2/1987 | Larsen | |
| 4,680,336 A | 7/1987 | Larsen et al. | |
| 4,691,820 A | 9/1987 | Martinez | |
| 4,768,919 A | 9/1988 | Borgman et al. | |
| 4,773,523 A | * 9/1988 | Hansen, Jr. et al. | 901/8 X |
| 4,795,124 A | 1/1989 | Nagai | |
| 4,889,664 A | 12/1989 | Kindt-Larsen | |
| 5,039,459 A | 8/1991 | Kindt-Larsen | |
| 5,094,609 A | 3/1992 | Kindt-Larsen | |
| 5,222,854 A | 6/1993 | Blatt | |
| 5,234,328 A | 8/1993 | Willson et al. | |
| 5,476,111 A | 12/1995 | Andersen et al. | |
| 5,575,376 A | 11/1996 | Colamussi | |
| 5,578,331 A | 11/1996 | Martin et al. | |
| 5,681,138 A | 10/1997 | Lust et al. | |
| 5,948,341 A | 9/1999 | Diamond et al. | |

FOREIGN PATENT DOCUMENTS

| | | |
|---|---|---|
| EP | 637491 | 2/1995 |
| EP | 691195 | 1/1996 |
| GB | 1092749 | 11/1967 |

\* cited by examiner

*Primary Examiner*—D. Underwood

(57) ABSTRACT

This invention relates to a device for removing and transporting articles, such as ophthalmic lens mold sections, or packaging elements from a mold. The invention, in one embodiment includes first, second, and third assemblies; the first of which removes the articles from the molding station at a first location and transports them to a second location; the second assembly receives the articles from the first assembly and transports them to a third location, and the third assembly receives the articles from the second assembly and transports them to a fourth location. A second embodiment includes a flipper assembly disposed between the first and second assemblies, which flipper receives the articles from the first assembly and inverts them before depositing them onto the second assembly. This second embodiment is useful in conjunction with molded articles which are transported to the flipper assembly in an inverted position. A third embodiment includes second and third assemblies which further include means for altering the relative spacing of the articles while the articles are transported.

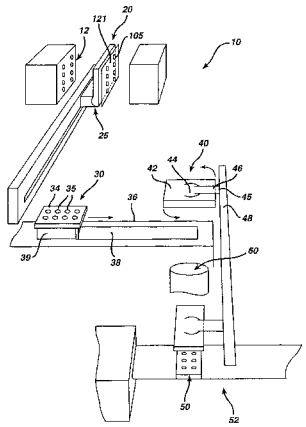

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4 and 5 is confirmed.

Claims 1, 2 and 3 are cancelled.

\* \* \* \* \*